US010772326B2

(12) United States Patent
Gabriel et al.

(10) Patent No.: US 10,772,326 B2
(45) Date of Patent: Sep. 15, 2020

(54) USE OF ALDEHYDES FORMULATED WITH NANOPARTICLES AND/OR NANOEMULSIONS TO ENHANCE DISEASE RESISTANCE OF PLANTS TO LIBERIBACTERS

(71) Applicants: UNIVERSITY OF FLORIDA RESEARCH FOUNDATION, INC., Gainesville, FL (US); INTEGRATED PLANT GENETICS, INC., Gainesville, FL (US)

(72) Inventors: Dean W. Gabriel, Gainesville, FL (US); Shujian Zhang, Gainesville, FL (US)

(73) Assignees: INTEGRATED PLANT GENETICS, INC., Gainesville, FL (US); UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 15/271,860

(22) Filed: Sep. 21, 2016

(65) Prior Publication Data

US 2017/0006863 A1 Jan. 12, 2017

Related U.S. Application Data

(63) Continuation-in-part of application No. PCT/US2015/022046, filed on Mar. 23, 2015.

(60) Provisional application No. 62/115,893, filed on Feb. 13, 2015, provisional application No. 62/088,203, filed on Dec. 5, 2014, provisional application No. 61/968,498, filed on Mar. 21, 2014.

(51) Int. Cl.
*A01N 35/02* (2006.01)

(52) U.S. Cl.
CPC .................................... *A01N 35/02* (2013.01)

(58) Field of Classification Search
CPC ........ A01N 35/02; A01N 25/02; A01N 25/04; A01N 31/02; A01N 59/16
See application file for complete search history.

(56) References Cited

U.S. PATENT DOCUMENTS

| | | | | |
|---|---|---|---|---|
| 2,465,854 | A | 3/1949 | Dorman et al. | |
| 4,978,686 | A | 12/1990 | Sotome | |
| 6,251,951 | B1 | 6/2001 | Emerson et al. | |
| 6,750,256 | B1 | 6/2004 | Crandall, Jr. et al. | |
| 2009/0298951 | A1* | 12/2009 | Van Etten | A01N 37/06 514/762 |
| 2011/0151018 | A1 | 6/2011 | Garrity et al. | |
| 2011/0244056 | A1* | 10/2011 | Santra | A01N 25/34 424/630 |
| 2013/0085067 | A1 | 4/2013 | Schofield et al. | |
| 2014/0045692 | A1 | 2/2014 | Rossines et al. | |

FOREIGN PATENT DOCUMENTS

| | | | | |
|---|---|---|---|---|
| CN | 101589725 A | 12/2009 | | |
| FR | 2529755 | 1/1984 | | |
| GB | 504125 | 4/1939 | | |
| WO | WO-2005027872 A2 * | 3/2005 | | A61K 9/1075 |
| WO | WO 2015/070157 A1 | 5/2015 | | |
| WO | WO2015/107089 A1 | 7/2015 | | |
| WO | WO 2015/143444 A1 | 9/2015 | | |

OTHER PUBLICATIONS

OOi et al. (The American Journal of Chinese Medicine, 2006, 34, 511-522).*

Li et al. (Proteins, the ABC Transporters in Candidatus Liberibacter asiaticus, published online Jul. 18, 2012, 2614-2628).*

Zhang et al. (Phytopathology, 2011, 101, 1097-1103). (Year: 2011).*

Dutt et al. (Published Jan. 1, 2014, Screening of Transgenic Citrus for HLB Resistance. Journal of Citrus Pathology, 1(1). Retrieved from https://escholarship.org/uc/item/0fc892b7) (Year: 2014).*

Abad, J. A., et al. "First report of the detection of *Candidatus liberibacter'* species in zebra chip disease-infected potato plants in the United States." Plant Disease 93.1 (2009): 108-108.

Alfaro-Fernández, A., et al. "'Candidatus Liberibacter solanacearum' associated with Bactericera trigonica-affected carrots in the Canary Islands." Plant Dis. (2012); 96:581-582.

Alfaro-Fernández, A., et al. "First report of 'Candidatus Liberibacter solanacearum' in carrot in mainland Spain." Plant Dis. (2012); 96:582.

Aubert, B., and Bove, J. M.. "Effect of penicillin or tetracycline injections of citrus trees affected by greening disease under field conditions in Reunion Island." Proceedings of the 8th Conference International Organization of Citrus Virologists. 1980.

(Continued)

*Primary Examiner* — Jean P Cornet

(74) *Attorney, Agent, or Firm* — Cooley LLP

(57) ABSTRACT

Methods and compositions based upon natural phenolic aromatic aldehydes (ex: cinnamaldehyde, benzaldehyde) are provided, which find use as curing agents for systemic bacterial infections of living plants, in particular against Gram negative bacteria and more particularly species of *Liberibacter*, including *Ca. Liberibacter asiaticus*. The curing agent compositions described are used synergistically with other antimicrobial compounds, such as those that plants manufacture or release as a result of biotic or abiotic stresses, including the application of the subject aldehydes, certain proteins, whether produced by recombinant methods or not, nanoparticles, nanoemulsions, or by natural essential oils such as carvacrol or allicin. The aromatic aldehydes have high volatility and exhibit phytotoxicity when applied above certain amounts. Systemic infections and infestations of a variety of plant parts can be treated, including those of leaves and roots. Methods of applying the compositions for agriculture use are disclosed.

14 Claims, 5 Drawing Sheets

(56) References Cited

OTHER PUBLICATIONS

Beattie, G. A. C., et al. "On the origins of citrus, Huanglongbing, Diaphorina citri and Trioza erytreae." Orlando, Florida, USA: International Conference of Huanglongbing Florida. 2008.
Birkinshaw, J. H., et al. "Biochemistry of the wood-rotting fungi. 9. Volatile metabolic products of Stereum subpileatum Berk. & Curt." Biochemical Journal 66.1 (1957): 188-192.
Bosshart, Patrick D., et al. "The transmembrane protein KpOmpA anchoring the outer membrane of Klebsiella pneumoniae unfolds and refolds in response to tensile load." Structure 20.1 (2012): 121-127.
Bové, Joseph M. "Huanglongbing: a destructive, newly-emerging, century-old disease of citrus." Journal of Plant Pathology (2006): 7-37.
Bové, Josy. "Heat-tolerant Asian HLB meets heat-sensitive African HLB in the Arabian Peninsula! Why?." Journal of Citrus Pathology 1.1 (2014).
Burt, Sara. "Essential oils: their antibacterial properties and potential applications in foods—a review." International Journal of Food Microbiology 94.3 (2004): 223-253.
Catling, H.D. "The bionomics of the South African citrus psylla, Trioza erytreae (Del Guercio) (Homoptera: Psyllidae ). III. The influence of extremes of weather on survival." J. Ent. Soc. S. Africa (1969); 32:273-290.
Choi, Ae-Jin, et al. "Characterization of capsaicin-loaded nanoemulsions stabilized with alginate and chitosan by self-assembly." Food and Bioprocess Technology 4.6 (2011): 1119-1126.
Cloyd, Raymond A., and Cycholl, Nina L. "Phytotoxicity of selected insecticides on greenhouse-grown herbs." HortScience 37.4 (2002): 671-672.
De Rudder, Karel EE, et al. "Plant-exuded choline is used for rhizobial membrane lipid biosynthesis by phosphatidylcholine synthase." Journal of Biological Chemistry 274.28 (1999): 20011-20016.
Deng, Wen-Ling, et al. "Effects of galU mutation on Pseudomonas syringae-plant interactions." Molecular Plant-Microbe Interactions 23.9 (2010): 1184-1196.
Donsì, Francesco, et al. "Design of nanoemulsion-based delivery systems of natural antimicrobials: effect of the emulsifier." Journal of Biotechnology (2012); 159.4: 342-350.
Duan, Yongping, et al. "Complete genome sequence of citrus huanglongbing bacterium,'Candidatus Liberibacter asiaticus' obtained through metagenomics." Molecular Plant-Microbe Interactions 22.8 (2009): 1011-1020.
Ford, Kevin A., et al. "Neonicotinoid insecticides induce salicylate-associated plant defense responses." Proceedings of the National Academy of Sciences 107.41 (2010): 17527-17532.
Friedman, Mendel, et al. "Antibacterial activities of phenolic benzaldehydes and benzoic acids against Campylobacter jejuni, *Escherichia coli*, Listeria monocytogenes, and *Salmonella enterica*." Journal of Food Protection 66.10 (2003): 1811-1821.
Garnier, M., N. Danel, and Bové, J. M. "The greening organism is a gram negative bacterium." Proc. 9th Conference of the International Organization of Citrus Virologists. University of California, Riverside, CA. 1984.
Geng, Shi-Lei, et al. "Histochemistry and cell wall specialization of oil cells related to the essential oil accumulation in the bark of Cinnamomum cassia Presl.(Lauraceae)." Plant Production Science 15.1 (2012): 1-9.
Haakana, K., et al. "Gaseous ethanol penetration of plant tissues positively effects the growth and commercial quality of miniature roses and dill." Scientia Horticulturae 88.1 (2001): 71-84.
Hansen, A. K., et al. "A new huanglongbing species," Candidatus Liberibacter psyllaurous,"found to infect tomato and potato, is vectored by the psyllid Bactericera cockerelli (Sulc)." Applied and Environmental Microbiology 74.18 (2008): 5862-5865.
Hill, Laura E., et al. "Antimicrobial Efficacy of Poly (DL-lactide-co-glycolide)(PLGA) Nanoparticles with Entrapped Cinnamon Bark Extract against Listeria monocytogenes and *Salmonella typhimurium*." Journal of Food Science 78.4 (2013): N626-N632.
Imlau, Astrid, et al. "Cell-to-cell and long-distance trafficking of the green fluorescent protein in the phloem and symplastic unloading of the protein into sink tissues." The Plant Cell 11.3 (1999): 309-322.
International Preliminary Report on Patentability in International Application No. PCT/US2015/022046 dated Sep. 21, 2016, 12 pages.
International Search Report and Written Opinion in International Application No. PCT/US2015/022046 dated Jun. 18, 2015, 14 pages.
Jagoueix, Sandrine, et al. "The phloem-limited bacterium of greening disease of citrus is a member of the α subdivision of the Proteobacteria." International Journal of Systematic and Evolutionary Microbiology 44.3 (1994): 379-386.
Kawahara, Kazuyoshi, et al. "Chemical structure of glycosphingolipids isolated fromSphingomonas paucimobilis." FEBS Letters 292.1 (1991): 107-110.
Kawahara, Kazuyoshi, et al. "Structural analysis of two glycosphingolipids from the lipopolysaccharide-lacking bacterium Sphingomonas capsulata." European Journal of Biochemistry 267.6 (2000): 1837-1846.
Keck, Matthias, et al. "Unusual outer membrane lipid composition of the gram-negative, lipopolysaccharide-lacking myxobacterium Sorangium cellulosum So ce56." Journal of Biological Chemistry 286.15 (2011): 12850-12859.
Khemani, Manisha, et al. "Encapsulation of berberine in nano-sized PLGA synthesized by emulsification method." ISRN Nanotechnology (2012); vol. 2012, Article ID 187354, 9 pages.
Koebnik, Ralf, et al. "Structure and function of bacterial outer membrane proteins: barrels in a nutshell." Molecular Microbiology 37.2 (2000): 239-253.
Leonard, Michael T., et al. "Complete genome sequence of Liberibacter crescens BT-1." Standards in Genomic Sciences 7.2 (2012): 271-283.
Leone, Serena, et al. "The structures of glycolipids isolated from the highly thermophilic bacterium Thermus thermophilus Samu-SA1." Glycobiology 16.8 (2006): 766-775.
Li, Wenbin, et al. "Optimized quantification of unculturable *Candidatus Liberibacter* spp. in host plants using real-time PCR." Plant Disease 92.6 (2008): 854-861.
Liefting, Lia W., et al. "'Candidatus Liberibacter solanacearum', associated with plants in the family Solanaceae." International Journal of Systematic and Evolutionary Microbiology 59.9 (2009): 2274-2276.
Lopes, S. A., et al. "Liberibacters associated with citrus huanglongbing in Brazil:'Candidatus Liberibacter asiaticus' is heat tolerant,'Ca. L. americanus' is heat sensitive." Plant Disease 93.3 (2009): 257-262.
Mason, T. G., et al. "Nanoemulsions: formation, structure, and physical properties." Journal of Physics: Condensed Matter 18.41 (2006): R635.
Moran, V. C., and Blowers, J.R. "On the biology of the South African citrus psylla, Trioza erytreae (del guercio)(Homoptera: Psyllidae)." Journal of Entomological Society of South Africa 30 (1967): 96-106.
Munyaneza, J. E., et al. "First report of "Candidatus Liberibacter solanacearum" associated with psyllid-affected carrots in Norway." Plant Disease 96 (2012b): 3: 454, 3 pages.
Munyaneza, J. E., et al. "First report of "Candidatus Liberibacter solanacearum" associated with psyllid-affected carrots in Sweden." Plant Disease 96 (2012a): 3: 453, 2 pages.
Nelson, Warrick R., et al. "Haplotypes of "Candidatus Liberibacter solanacearum" suggest long-standing separation." European Journal of Plant Pathology 130.1 (2011): 5-12.
Niu, Zhiqiang, and Li, Yadong. "Removal and utilization of capping agents in nanocatalysis." Chemistry of Materials (2013); 26.1: 72-83.
Ooi, Linda SM, et al. "Antimicrobial activities of cinnamon oil and cinnamaldehyde from the Chinese medicinal herb Cinnamomum cassia Blume." The American journal of Chinese Medicine 34.03 (2006): 511-522.
Palanikumar, L., et al. "Influence of particle size of nano zinc oxide on the controlled delivery of Amoxicillin." Applied Nanoscience 3.5 (2013): 441-451.

(56) References Cited

OTHER PUBLICATIONS

Pieterse, C. M. L., et al. "Systemic resistance in *Arabidopsis* induced by biocontrol bacteria is independent of salicylic acid accumulation and pathogenesis-related gene expression." The Plant Cell 8.8 (1996): 1225-1237.
Raddadi, Noura, et al. "'Candidatus *Liberibacter europaeus*' sp. nov. that is associated with and transmitted by the psyllid Cacopsylla pyri apparently behaves as an endophyte rather than a pathogen." Environmental Microbiology 13.2 (2011): 414-426.
Saglio, P., et al. "Isolement culture et observation au microscope electronique des structures de type mycoplasme associees a la maladie du Stubborn des agrumes et leur comparaison avec les structures observees dans le cas de la maladie du Greening des agrumes." Physiologie Ve l ge l tale (1971); 9: 569-582 (with English summary).
Schultz, Christian P., et al. "Evidence for a New Type of Outer Membrane Lipid in Oral Spirochete Treponema denticola Functioning Permeation Barrier Without Lipopolysaccharides." Journal of Biological Chemistry 273.25 (1998): 15661-15666.
Schwarz, R. E., and Green, G. C. "Heat requirements for symptom suppression and inactivation of the greening pathogen." Proceedings of the 5th Conference of the International Organisation of Citrus Virologists (1972); 44-51.
Secor, G. A., et al. "Association of'Candidatus Liberibacter solanacearum' with zebra chip disease of potato established by graft and psyllid transmission, electron microscopy, and PCR." Plant Disease 93.6 (2009): 574-583.
Smith, Stephen GJ, et al. "A molecular Swiss army knife: OmpA structure, function and expression." FEMS Microbiology Letters 273.1 (2007): 1-11.
Sugawara, E., and Nikaido, H. "Pore-forming activity of OmpA protein of *Escherichia coli*." Journal of Biological Chemistry 267.4 (1992): 2507-2511.
Teixeira, Ddo C., et al. "'Candidatus Liberibacter americanus', associated with citrus huanglongbing (greening disease) in São Paulo State, Brazil." International Journal of Systematic and Evolutionary Microbiology 55.Pt 5 (2005): 1857-1862.
Weiss, Jochen, et al. "Functional materials in food nanotechnology." Journal of Food Science 71.9 (2006): R107-R116.
Wessel, Mirja, et al. "Virulence of Agrobacterium tumefaciens requires phosphatidylcholine in the bacterial membrane." Molecular microbiology 62.3 (2006): 906-915.
Wulff, Nelson A., et al. "The complete genome sequence of'Candidatus Liberibacter americanus', associated with Citrus huanglongbing." Molecular Plant-Microbe Interactions (2014); 27.2: 163-176.
Xie, Yanping, et al. "Antibacterial activity and mechanism of action of zinc oxide nanoparticles against Campylobacter jejuni." Applied and Environmental Microbiology 77.7 (2011): 2325-2331.
Zhang, Muqing, et al. "Chemical compounds effective against the citrus Huanglongbing bacterium 'Candidatus Liberibacter asiaticus' in planta." Phytopathology 101.9 (2011): 1097-1103.
Zhang, Muqing, et al. "Screening molecules for control of citrus huanglongbing using an optimized regeneration system for 'Candidatus Liberibacter asiaticus'—infected periwinkle (Catharanthus roseus) cuttings." Phytopathology 100.3 (2010): 239-245.
Zipfel, Cyril, and Robatzek, Silke. "Pathogen-associated molecular pattern-triggered immunity: veni, vidi . . . ?." Plant Physiology 154.2 (2010): 551-554.
Paulus, Microbicides for the Protection of Materials: A Handbook. Springer Science & Business Media. 497 pages. 2012. (pp. 37-38 and 50-53).
Pelttari et al., Antimicrobial Properties of Substituted Salicylaldehydes and Related Compounds. Zeitschrift fur Naturforschung. 62(7-8):487-497, 2007.
Simoes et al., Antimicrobial mechanisms of ortho-phthalaldehyde action. Journal of Basic Microbiology. 47(3):230-242, 2007. (Abstract).
Kim et al., Antifungal activity of redox-active benzaldehydes that target cellular antioxidation. Annals of Clinical Microbiology and Antimicrobials. 10(23). 16 pgs. 2011.
Klinke et al., Inhibition of ethanol-producing yeast and bacteria by degradation products produced during pre-treatment of biomass. Applied Microbiology and Biotechnology. 66(1):10-26. 2004.
Fitzgerald et al., Mode of antimicrobial action of vanillin against *Escherichia coli*, Lactobacillus plantarum and Listeria innocua. Journal of Applied Microbiology. 97:104-113. 2004.
Chitra Som et al., "Antibacterial activities of polyunsaturated fatty acid extracts from Sardinella longiceps and Sardinella fimbriata," Indian Journal of Geo-Marine Sciences, Oct. 2011, vol. 40(5), pp. 710-716.

* cited by examiner

USE OF ALDEHYDES FORMULATED WITH NANOPARTICLES AND/OR NANOEMULSIONS TO ENHANCE DISEASE RESISTANCE OF PLANTS TO LIBERIBACTERS

CROSS REFERENCE TO RELATED APPLICATIONS

This application is a U.S. Continuation-In-Part Application of International Application No.: PCT/US2015/022046, filed Mar. 23, 2015, which claims priority to U.S. Provisional Application Nos. 61/968,498, filed Mar. 21, 2014; 62/088,203, filed Dec. 5, 2014; and 62/115,893, filed Feb. 13, 2015; the entire contents of which are all hereby incorporated by reference in their entirety for all purposes.

BACKGROUND OF THE INVENTION

Huanglongbing (HLB), commonly known as citrus "greening" disease, is one of the top three most damaging diseases of citrus in Africa, America and Asia. HLB is naturally transmitted by psyllids, and experimentally by grafting or dodder (*Cuscuta* spp.). The disease was shown to be graft-transmissible in 1956 (Lin, 1956) and therefore it was thought to be caused by a putative virus. However, in 1970, sieve tube restricted bacteria were discovered in affected trees. First thought to be *mycoplasma*-like (Laflèche and Bové, 1970), they were soon recognized as walled bacteria (Saglio et al., 1971; Bovd and Saglio, 1974) of the Gram negative type (Gamier et al., 1984) and finally shown to be species of alpha proteobacteria (Jagoueix, et al. 1994). Two species were recognized: *Candidatus Liberibacter asiaticus* (Las) for the disease in Asia and *Ca. L. africanus* (Laf) for the disease in Africa.

In 2004, when HLB was seen for the first time in the Americas and more precisely in Sbo Paulo State, Brazil, two liberibacter species were identified: (i) a new species, *Ca. L. americanus* (Lam), infecting most of the affected trees, and (ii) the known *Asian liberibacter*, Las, present in a minority of trees (Teixeira et al., 2005). All three citrus liberibacters are uncultured and phloem-limited. That is, these bacteria live in plants exclusively within living plant phloem cells. Las is the most widely distributed by far. Today, HLB caused by Las has been identified in states ranging from Florida, Louisiana, and California.

With no effective treatment options available in the market, there is a growing demand for new technologies to combat its spread.

SUMMARY OF THE INVENTION

The disclosure teaches compositions useful for protecting plants against intracellular bacterial attack and infection and particularly for treatment of plants already infected with systemic Liberibacter species, comprising at least one aromatic aldehyde species and optionally, in concentrations sufficient for eliciting plant defense responses. This disclosure also teaches use of at least one polar solvent, and/or a laminar penetrant, and/or a nanoemulsion, and/or a nanoparticle formulation that is useful for delivery and penetration of the aldehyde into plant cells. This disclosure also teaches the use of plant systemic acquired resistance (SAR) inducers in combination with at least one aromatic aldehyde to increase plant defense responses.

The disclosure teaches compositions and methods useful for curing and protecting plants and crops, including trees, against intracellular bacterial disease, including disease caused by bacterial species of the genus *Liberibacier*, comprising at least one aromatic aldehyde species.

In some embodiments, the application or injection of the composition results in a reduction in the number of bacteria, that is, the titer, infecting the plants. In other embodiments, the application or injection of the composition results in a reduction in the number of bacteria infecting the plants, the incidence of disease, or the incidence of disease symptoms. In other embodiments, the reduction in bacteria or bacterial titer is statistically significant, as compared with untreated infected plants.

In some embodiments, the application or injection of the composition also results in an increase in the crop or fruit yield.

In some embodiments, the curing and protecting of plants, is measured against an infected control plant that has not been treated with the compositions. In other embodiments, the reduction in bacteria infecting the plant, incidence of disease, or incidence of disease symptoms are measured against an infected control crop that has not been treated with the compositions.

In some embodiments, the application or injection of the composition results in a partial clearance of the bacteria from the plant, as compared to an untreated infected plant. In further embodiments the partial clearance may be at least 5%, 10%, 15%, 20%, 25%, 30%, 35%, 40%, 45%, 50%, 60%, 65%, 70%, 75%, 80%, 85%, 90%, 95%, 96%, 97%, 98%, or 99% in the titer of bacterial cells infecting the plant; including those of *Liberibacter.*

In some embodiments, the aromatic aldehyde species of the present invention are selected from the group consisting of cinnamaldehyde, coniferyl aldehyde, carvacrol, and geraniol. In one embodiment, the composition comprises cinnamaldehyde as the aromatic aldehyde.

In some embodiments, the composition comprises a short chain ($C_1$-$C_6$) alcohol or dimethyl sulfoxide (DMSO) solvents for the application and cell penetrating delivery of the aldehyde, nanoemulsion formulation, or nanoparticle formulation.

In some embodiments, the nanoemulsions or nanoparticles are made from Vitamin E, tocopheryl polyethylene glycol succinate (TPGS), Dodecanoic acid, Octadecanoic acid, Tetradecanoic acid, Lecithin, Oleic Acid, Polyoxyethylene sorbitan monolaurate (Tween 20), ZnS, ZnO, and/or poly(lactic-co-glycolic acid) (PLGA).

In some embodiments taught herein, the polar solvent is at least one selected from the group consisting of methanol, ethanol, propanol, butanol, pentanol, hexanol, DMSO, and water. In some embodiments, the polar solvent is ethanol. In other embodiments, the polar solvent is DMSO. The present disclosure utilizes polar solvent and protic solvent as synonyms.

In some embodiments taught herein, the composition comprises a nanoemulsion, or nano-scale emulsion, formed from the use of Vitamin E, TPGS, Dodecanoic acid, Octadecanoic acid, Tetradecanoic acid, Lecithin, Oleic Acid, and/or Tween 20. In some embodiments, the nanoemulsion is formed from TPGS using DMSO. In some embodiments, the nanoemulsion is formed from TPGS using ethyl acetate.

In some embodiments taught herein, the nanoparticle species of the present invention are selected from the group consisting of zinc oxide, zinc sulfide, polyethylene glycol (PEG), and. In some embodiments, the nanoparticles are formed from PLGA. In other embodiments, the nanoparticles are formed from zinc sulfide.

In some embodiments taught herein, a leaf lamina penetrant is used, such as a surfactant or DMSO.

In some embodiments taught herein, the SAR inducers are selected from a group of neonicotinoid insecticides, including imidacloprid and clothianidin. In another embodiment, the SAR inducer is salicylic acid (SA).

In some embodiments of the present invention, the method for curing and/or controlling intracellular bacteria in plants comprises injecting a plant with a composition comprising at least one aromatic aldehyde.

In some embodiments, the method of injection of a plant is by pressurized syringe.

In another embodiment, the method injection of a plant is by drip bag.

In some embodiments of the present invention, the method for curing and/or controlling intracellular bacteria in plants comprises foliar spray of a composition comprising at least one aromatic aldehyde.

In some embodiments, the intracellular bacteria infecting the plant are phloem limited.

In some embodiments, the intracellular bacteria infecting the plant are Liberibacters.

In some embodiments, the composition utilized in the methods comprises cinnamaldehyde as an aromatic aldehyde.

In another particular embodiment, the composition utilized in the present methods comprises DMSO, isopropanol or ethanol as a polar solvent for the aromatic aldehyde.

In one embodiment, a method of protecting a plant from bacterial attack or infection comprises contacting or injecting one or more parts of the plant with the composition. In a further embodiment, the method comprises contacting or injecting one or more parts of the plant with the composition.

In one embodiment, a method of curing a plant infected by bacteria, methods of the present disclosure comprise contacting or injecting one or more parts of the plant with the composition.

In one embodiment, a method of curing plants infected with *Liberibacter* bacteria comprises contacting or injecting one or more parts of said plant with a composition comprising at least one aromatic aldehyde; and either at least one penetrating polar solvent, or a formulation comprising a nano-scale emulsion and/or nanoparticles containing the aromatic aldehyde, wherein said at least one aromatic aldehyde is present in an amount of up to 10% of the total composition applied to the plant, and wherein the at least one polar solvent is present in an amount of at least 5% of the total composition.

In one embodiment, a method for curing plants infected with *Liberibacter* bacteria comprises contacting or injecting one or more parts of said plant with a composition comprising at least one aromatic aldehyde incorporated in or used as a capping agent for nanoparticles; and either at least one polar solvent or a formulation comprising a nano-scale emulsion and/or nanoparticles containing the aromatic aldehyde. In a further embodiment, the aromatic aldehyde comprises an aromatic aldehyde incorporated in a nanoemulsion. In a further embodiment, the at least one aromatic aldehyde comprises cinnamaldehyde, and the at least one polar solvent comprises DMSO, isopropanol, or water, and the emulsifier comprises Vitamin E, Tocopheryl Polyethylene Glycol Succinate (TPGS), Dodecanoic acid, Zinc stearate, Glyceryl dimyristate, Lecithin, Oleic Acid, and/or Polyoxyethylene sorbitan monolaurate (Tween 20).

In one embodiment, treating the plants with the composition results in the plants infected with *Liberibacter* bacteria exhibit a decrease in bacteria and an increase in fruit yield, relative to plants not having been contacted or injected with the composition.

In one embodiment, the composition applied to the plants comprises a nanoparticles such as PLGA and present in a range of about 0.02% to about 0.075% of the total composition; ZnS and present in an amount of about 0.974% of the total composition; or ZnO and present in an amount of about 0.0625% of the total composition. In further embodiments, the nanoparticles range in size from between about 2 nm and about 100 nm.

In one embodiment, the method of treating a plant with the composition results in a reduction of at least 5% in the level of bacterial infection or bacterial titer in infected plants one month or longer after treatment of the plant. In a further embodiment, the plant is a citrus tree or seedling.

In one embodiment, a method for curing citrus trees or seedlings from any *Liberibacter capable of causing Huanglongbing Disease, including but not limited to Ca. L. asiaticus, Ca. L africanus* or *Ca. L. americanus* and protecting citrus trees and seedlings from infestation by psyllids capable of transmitting the agents of Huanglongbing Disease, including but not limited to *Ca. L. asiaticus, Ca. L. africanus* or *Ca. L. americamnus* comprising contacting one or more parts of said citrus trees or seedlings with a formulation comprising an amount of from about 2.5 to 100 g/l of cinnamaldehyde, wherein the amount is sufficient to provide at least about 5% reduction in titer of *Liberibacter* cells.

In one embodiment, a method for curing potato, tomato, celery, or carrot plants, seedlings or shoots from Liberibacters, and protecting potato, tomato, celery, or carrot plants, seedlings, or shoots from infestation by Liberibacters carried by insect vectors comprising contacting one or more parts of the potato, tomato, celery, or carrot plants, seedlings or shoots with a formulation comprising an amount of cinnamaldehyde of about 2.5 to 100 g/l, wherein the amount is sufficient to provide at least a 5% reduction in titer of Liberibacter cells.

In some embodiments, the compositions may comprise (a) at least one aromatic aldehyde; and (b) at least one polar solvent, wherein said at least one aromatic aldehyde comprises cinnamaldehyde and at least one polar solvent comprises DMSO. In further embodiments, compositions may comprise (a) at least one aromatic aldehyde and (b) at least one emulsifying agent used to form a nanoemulsion, wherein said at least one aromatic aldehyde comprises cinnamaldehyde, the nanoemulsions are less than about 200 nm in size and the at least one emulsifying agent comprises Vitamin E, TPGS, Dodecanoic acid, Octadecanoic acid, Tetradecanoic acid, Lecithin, or Tween 20.

In some embodiments, the compositions comprise (a) at least one aromatic aldehyde incorporated in or used as a capping agent for nanoparticles; and (b) at least one polar solvent, wherein said at least one aromatic aldehyde comprises cinnamaldehyde, the nanoparticles are less than about 200 nm in size and at least one polar solvent comprises DMSO. In some embodiments, the nanoparticles are selected from a group consisting of zinc oxide, zinc sulfide, poly(lactic-co-glycolic acid) or (PLGA) polymers.

In some embodiments, the methods taught herein include the step of injecting or spraying one or more parts or tissues of a diseased plant, or a plant susceptible to attack by pathogens, with cinnamaldehyde, whether incorporated or not in nanoparticles or nanoemulsions, and a penetrating solvent in an amount sufficient to control growth of target pathogenic organisms.

In some embodiments, the compositions taught herein are effective as antibacterial curing agents against infections of *Liberibacter*, including, but not limited to *Ca. L. asiaticus*, causing Huanglongbing (HLB) disease.

In some embodiments, the composition of the present invention comprises a solution of aromatic aldehyde incorporated in nanoparticles or nanoemulsions in greater than 5% DMSO, ethyl or isopropyl alcohol.

In other embodiments, the composition of the present invention comprises a solution of aromatic aldehyde, incorporated or not into nanoemulsions or nanoparticles of less than 200 nm in size and in water.

In other embodiments, the composition of the present invention comprises a solution of aromatic aldehyde, incorporated or not into nanoemulsions or nanoparticles of less than 200 nm in size and in greater than 10% DMSO.

In some embodiments, the composition relates to an injectable solution of aromatic aldehyde incorporated or not in nanoemulsions or nanoparticles in water.

In some embodiments, the composition relates to an injectable solution of aromatic aldehyde incorporated or not in nanoemulsions or nanoparticles in greater than 5% ethyl alcohol.

In some embodiments, the composition relates to an injectable solution of aromatic aldehyde, incorporated in nanoemulsions or nanoparticles or not and between 0% and up to 100% DMSO.

In another embodiment, the invention relates to a solution of aromatic aldehyde, incorporated in nanoemulsions or nanoparticles or not and any suitable polar solvent or combination of solvents.

In one embodiment, the taught composition is a solution comprising about 1.5% cinnamaldehyde incorporated into nanoparticles in about 70% isopropanol or ethanol.

In one embodiment, the taught composition is a solution comprising at least about 1.5% cinnamaldehyde incorporated into nanoemulsions in water.

In a further embodiment, the taught composition is a solution comprising less than or equal to about 9% cinnamaldehyde incorporated into nanoemulsions in water.

In another embodiment, the taught composition is a solution comprising about 1.5% cinnamaldehyde in about 50% DMSO.

In another embodiment, the taught composition is a solution comprising about 1.5% cinnamaldehyde in about 100% DMSO.

In another embodiment, the taught composition is a solution comprising about 1.5% to about 3% cinnamaldehyde in an emulsion formed using TPGS.

In another embodiment, the taught composition is a solution comprising about 1.5% to about 3% cinnamaldehyde in a solution of zinc sulfide nanoparticles.

In another embodiment, the taught composition is a solution comprising about 1.5% cinnamaldehyde in a solution of PLGA nanoparticles.

In another embodiment, the taught composition is a solution comprising about 1.5% cinnamaldehyde in a solution of zinc oxide nanoparticles.

The compositions of cinnamaldehyde, cinnamaldehyde incorporated in nanoparticles and plant cell penetrating solvent such as DMSO or ethanol according to the present invention provide enhanced permeation of cinnamaldehyde, and combined with the natural defense systems of plants, or combined with a synergistic additional element, either a chemical or the genetically enhanced defense systems of plants, provides a cure for diseases caused by Liberibacters and likely other bacteria that live within living plant cells.

DETAILED DESCRIPTION OF THE INVENTION

Citrus Greening

Figure 1:
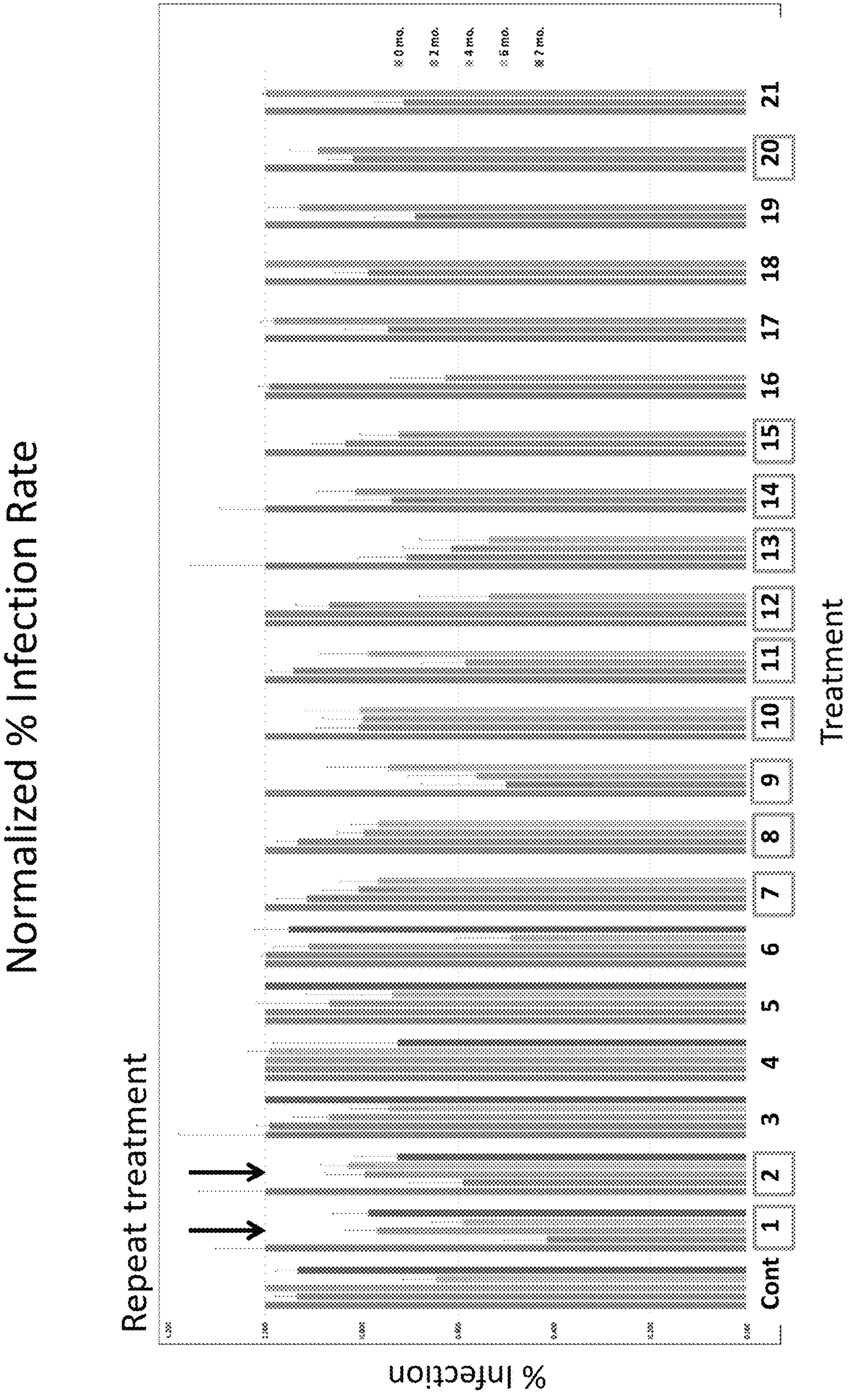
FIG. 1. Normalized percent infection rate with Las of Hamlin citrus trees grafted onto *Swingle citrumello* rootstock, as measured over a period of approximately seven months. Results are presented as % Las infection (total number of positive leaf samples (assessed by qPCR as described in Example 5) divided by the total number of leaf samples taken per treatment on a given sampling date). Samples were taken monthly over a period of 6-7 months. Each bar in FIG. 1 represents average % Las infection for each treatment of 10 trees, with data combined for each 2 month period. The "0 month" samples are pooled averages of all trees sampled in each treatment before any treatments. Data are presented are normalized such that pre-treatment infections are 100%. Non-overlapping Standard Errors are significant at $P<0.05$. The control group comprises 5 trees that were sprayed with 50% DMSO and 5 trees that were injected with 50% DMSO. The experimental treatments were as follows, Treatment 1: trunk injection with 40 ml per tree of 1.5% (w/v) cinnamaldehyde in 50% DMSO, followed by reapplication at month 4; Treatment 2: foliar spray with 800 ml per tree of 1.5% cinnamaldehyde in 50% DMSO, followed by reapplication at month 4; Treatment 3: 2.58 g wet weight ZnO nanoparticles diluted to 4 L (0.0625% ZnO) using 70% isopropanol and sprayed at 800 ml per tree; Treatment 4: 5% cinnamaldehyde in 250 ml isopropanol loaded onto 2.58 g wet weight ZnO nanoparticles and diluted to 4 L (0.0625% ZnO) using 1.5% cinnamaldehyde in 70% isopropanol and sprayed at 800 ml per tree; Treatment 5: 2.58 g wet weight ZnO nanoparticles diluted to 750 ml using 70% isopropanol (0.33% ZnO) and injected 40 ml per tree; Treatment 6: 5% cinnamaldehyde in 250 ml 70% isopropanol loaded onto 2.58 g wet weight ZnO nanoparticles and diluted to 750 ml (0.33% ZnO) using 1.5% cinnamaldehyde in 70% isopropanol and injected 40 ml per tree; Treatment 6. Treatment 7: spray of 800 ml per tree of PLGA nanoparticles plus cinnamaldehyde as described in Example 10; Treatment 8: injection of 40 ml per tree of PLGA nanoparticles plus cinnamaldehyde as described in Example 10; Treatment 9: injection of 40 ml per tree of PLGA nanoparticles lacking cinnamaldehyde in the diluent as described in Example 10; Treatment 10: injection of 40 ml per tree of PLGA nanoparticles plus cinnamaldehyde as described in Example 11; Treatment 11: injection of 40 ml per tree of a 1:1 dilution of the treatment 10 solution as described in Example 11, Treatment 12: spray of 800 ml per tree of PLGA nanoparticles plus cinnamaldehyde product diluted 1:5.3 using 50% DMSO plus 1.5% cinnamaldehyde as diluent as described in Example 11; Treatment 13: spray of 800 ml per tree of a 1:5.3 dilution of the 800 ml per tree of PLGA nanoparticles plus cinnamaldehyde product using water as diluent as described in Example 11; Treatment 14: injection of 40 ml per tree of ZnS nanoparticles plus 3% cinnamaldehyde product and 50% DMSO as described in Example 12; Treatment 15: spray of 800 ml per tree of a solution of the treatment 14 injection diluted with 25% DMSO as described in Example 12; Treatment 16: injection of 40 ml per tree of ZnS nanoparticles plus cinnamaldehyde and PEG product, and 25% DMSO as described in Example 13: Treatment 17: spray of 800 ml per tree of a diluted solution of the treatment 16 injection in 25% DMSO as described in Example 13; Treatment 18: a 40 ml injection of 1.85% SA in water; Treatment 19: spray of 2 L per tree of 3.7% SA in water; Treatment 20: injection of 40 ml per tree of ZnS nanoparticles capped plus cinnamaldehyde product, plus 1.85% SA, and 25% DMSO as described in Example 14; Treatment 21: spray of 2 L per tree of a solution of the treatment 20 injection diluted 1:40 with 10% DMSO and 3.7% SA as described in Example 14.

Huanglongbing (HLB), commonly known as citrus "greening" disease, is caused by a partially systemic bacterial infection of trees and other crop species, leading to leaf discoloration and reduced fruit production. In Florida, the spread of the invasive HLB disease presents a major threat to the citrus industry, whose loses due to this infection have reached millions of dollars per year. Since the insect vector has reached Texas and California, it is only a matter of time until the disease breaks out in those states as well.

HLB has been associated with infections from three *liberibacter* species: *Candidatus Liberibacter asiaticus* (Las) for the disease in Asia, *Ca. L. africanus* (Laf) for the disease in Africa, and *Ca. L. americanus* (Lam), for the disease in the Americas.

All three citrus liberibacters are uncultured and phloem-limited. That is, these bacteria live in plants entirely within living plant phloem cells. Las is the most widely distributed by far. In the whole of Asia, from the Indian subcontinent to Papua-New Guinea, HLB is exclusively caused by Las and transmitted by the Asian citrus psyllid, *Diaphorina citri*. Prior to 2004, Las was reported present only in Asia; it is now reported present in North, Central and South America. In Africa and Madagascar, HLB is caused by Laf and transmitted by the African citrus psyllid, *Trioza erytreae*. The "African" disease occurs in cool areas, often above 600 m altitude, with temperatures below 30° C. Both Laf and *T. erytreae* are native to Africa (Hollis, 1984; Beattie et al., 2008; Bové, 2013) and both are heat sensitive (Moran and Blowers, 1967; Catling, 1969; Schwarz and Green, 1972; Bové et al., 1974). In Brazil, both Las and Lam are transmitted by *D. citri*, the Asian citrus psyllid. Lam is significantly less heat tolerant than Las (Lopes et al., 2009b).

Beside the three citrus Liberibacters associated with HLB, three non-citrus *Liberibacter* species have been described. *Ca. L. solanacearum* (Lso), has been identified as the causal agent of serious diseases of potato ("Zebra chip"), tomato ("psyllid yellows") and other solanaceous crops in the USA, Mexico, Guatemala, Honduras, and New Zealand (Hansen et al., 2008; Abad et al., 2009; Liefting et al., 2009; Secor et al., 2009). In solanaceous crops, Lso is vectored by the tomato/potato psyllid *Bactericera cockerelli*. More recently, a different haplotype of Lso was found infecting carrots in Sweden. Norway, Finland, Spain and the Canary Islands (Alfaro-Fernandez et al., 2012a, 2012b Munyaneza et al., 2012a, 2012b; Nelson et al., 2011). The carrot haplotype of Lso is spread by the carrot psyllid *Trioza apicalis*, which does not feed on Solanaceae.

A fifth species of Liberibacter, *Ca. L. europaeus* (Leu) was recently found in the psyllid *Cacopsylla* pyri, the vector of pear decline phytoplasma. With *C. pyri* as the vector, Leu was transmitted to pear trees in which the *liberibacter* reached high titers but did not induce symptoms, thus behaving as an endophyte rather than a pathogen (Raddadi et al., 2011). Finally, a sixth species of *Liberibacter, Liberibacter crescens* (Lcr), was recently characterized after isolation from diseased mountain *papaya* (Babaco). Except for Lcr, which is not known to be pathogenic, all other described Liberibacters are pathogenic and must be injected into living plant cells by specific insects. Furthermore, the pathogenic Liberibacters can only live within specific insect and plant cells; as obligate parasites, they do not have a free living state.

To date, Lcr is the only Liberibacter to be grown in axenic culture (Leonard et al., 2012), and thus can serve as a proxy for in vitro testing of antimicrobial chemicals. Lcr has not been reported to date to have been successfully reinoculated and grown in any plant. In plants, Liberibacters live entirely within living phloem cells. They become partially systemic in plants, moving from the site of injection by phloem to the roots and to newly forming leaf and stem tissues. Exposure of these bacteria to chemicals that may control them requires that the chemicals first penetrate multiple plant or insect cell layers and then to move in a systemic or semi-systemic manner.

Disease Adaptations May Help Citrus Greening Bacteria Avoid Triggering the Plant Innate Immune System Despite the fact that Las and Lam have an intact outer membrane and presumably Lso does as well (Wulffe et al, 2014), most of the genes required for lipopolysaccharide (LPS) biosynthesis that are found in Las and Lso are missing from Lam, including lpxA, lpxB, and lpxC, which are involved in the first steps of the biosynthesis of lipid-A. Lack of LPS in Gram-negative species is very rare but the barrier function served by the LPS may not be needed by pathogenic Liberibacters. If the LPS is not needed as a barrier function in one Liberibacter then it may not function well as a barrier in the others, which may provide opportunities for unusual chemical control measures that would not likely work against bacteria with typical LPS barriers. Some promising chemicals are currently in field trials. Broad-spectrum antibiotics injected into trees have resulted in some degree of success, including penicillin G (Aubert and Bove, 1980; Zhang, Duan et al., 2010; Zhang, Powell et al., 2011).

Indeed, the barrier function normally provided by the LPS may be at least partially compensated by production of other classes of lipids in the outer membrane. For example, *Treponema denticola* was shown to be missing LPS but possessing instead a lipoteichoic acid-like membrane lipid, core structure and repeating units that functioned as a substitute permeation barrier (Schultz et al., 1998). Similarly, *Sphingomonas paucimobilis* (Kawahara et al., 1991) and *S. capsulate* (Kawahara et al., 2000) are devoid of LPS, but have as substitutes glycosphingolipids containing (S)-2-hydroxymyristic acid. In addition, *Sorangium cellulosum* produces sphingolipids as the major lipid class in the outer membrane, together with ornithine-containing lipids and ether lipids (Keck et al., 2011).

The loss of the Lam LPS indicates a distinct selection advantage served by losing the LPS, which is a major elicitor of plant innate immunity, or natural defense response. The LPS is one of several classic "pathogen-associated molecular patterns" or PAMPs, which are generally conserved molecules of microbial origin that are recognized by specific plant receptors, often in a synergistic manner, to trigger both early and late defense responses, including the oxidative burst, salicylic acid (SA) accumulation and callose deposition (Zipfel & Robatzek, 2010). Importantly, a defective LPS can still be capable of inducing PAMP triggered immunity (Deng et al., 2010).

Plant pathogenic microbes must either avoid PAMP recognition or actively suppress the plant defense responses that result from such recognition (Hann et al., 2010). Clearly, defects in the LPS barrier function would render Lam much more sensitive to innate plant immune responses than to most plant pathogenic microbes, but loss of all LPS components capable of PAMP activity should result in a reduced response in the first place.

In addition to missing nearly all LPS encoding genes, Lam is also missing a key outer membrane protein and known PAMP elicitor, OmpA, which helps stabilize the outer membranes of Gram negative bacteria, providing its structural shape, and anchoring it to the peptidoglycan layer (Smith et al. 2007). OmpA is the most abundant outer membrane protein in Enterobacteria (Bosshart et al. 2012); it is present at 100,000 copies cell-1 in *E. coli* (Koebnik et al. 2000). In *E. coli*, OmpA is believed to be a weak porin, involved in diffusion of nonspecific small solutes across the outer membrane (Sugawara and Nikaido 1992). OmpA is a major PAMP (Jeannin et al., 2002).

The phosphatidylcholine (PC) synthase pathway (de Rudder et al., 1999), which is unique to a small number (10-15%) of bacteria, including *Rhizobium* and *Agrobacterium* (Geiger et al., 2013) is found in all sequenced Liberibacters (Lam_551; CLIBASIA_03680; CKC_04930; B488_05590), and could enable PC biosynthesis from the abundant choline present in either plant or insect host. In those bacteria synthesizing PC, PC strongly affects the physicochemical properties of the bacterial membranes (Geiger et al., 2013). *Agrohacterium tumefaciens* mutants lacking PC are markedly impaired in virulence and are hypersensitive to detergent (Wessel et al., 2006). Finally, *Thermus thermophilus* has no LPS but polar glycolipids and a phosphoglycolipid were detected in the outer membrane (Leone et al., 2006).

Although a nearly complete set of flagellar biosynthetic genes were reported in Las, some of the flagella biosynthetic genes were reported as pseudogenes (Duan et al., 2009). However, no Las or Lam flagella have been reported observed in any publications, despite numerous electron micrographs of these bacteria infecting plants and psyllids (for example, Bove, 2006). The lack of flagella indicates inability to produce or activate flagellin expression, resulting in loss of this PAMP activity. Both Las and Lam have clearly evolved a strategy of PAMP avoidance, due to an intracellular lifestyle that depends upon avoidance of activation of host defense and cell death responses. Any chemicals that trigger plant defense responses, such as salicyclic acid (SA) (Pieterse et al., 1996) or neonicotinoid pesticides (Ford et al., 2010) would place the Liberibacter outer membrane barrier function as a likely very sensitive last line of defense against these plant defenses.

Liberibacter spread is controlled primarily and poorly through control of the psyllid vector, primarily through the use of neonicotinoid pesticides. There are no known effective control measures known against the systemic Liberibacter pathogens in plants, and no known way to cure an infected plant. Since the HLB disease causes such severe citrus fruit losses and eventually death of the citrus tree, and since citrus trees in groves can last 15-25 years, these trees represent a considerable investment. A cure for the disease is urgently needed.

Treating Citrus Greening (Huanglongbing or HLB).

The present invention is based in part on the discovery that aromatic aldehydes, when combined with a solvent penetrant such as DMSO or formulated into nanoparticles (NPs) or NP emulsions (hereafter referred to as NPs) and either combined with a solvent penetrant (such as ethanol or DMSO) or a surfactant penetrant (such as TPGS, Dodecanoic acid, Octadecanoic acid, Tetradecanoic acid, or Tween 20 or not, can provide a beneficial phytotoxic composition capable of treating HLB caused by liberibacter infections. While the inventors do not wish to be bound by any one theory of function, they hypothesize that penetration of low levels of aldehydes through the plant cells by the action of DMSO and/or surfactant and/or by virtue of the small size of the NP delivery vehicle and slow release features of causes failure of the Liberibacter outer membrane barrier function. Thus the inventors hypothesize that when combined with the non-lethal phytotoxic stress responses caused by the application of the compositions of the present invention, a beneficial systemic clearing effect is caused in the plant.

Cinnamaldehyde as a Disinfectant

Cinnamaldehyde is an organic aromatic aldehyde compound that is best known forgiving cinnamon its flavor and odor. The pale yellow viscous liquid occurs naturally in the bark of cinnamon trees and other species of the genus *Cinnamomum*. Plants that make essential oils such as cinnamaldehyde reportedly synthesize the compounds in plastids, where they are released into the cytoplasm and secreted through the surrounding plasmalemma (cell membrane) and are at least locally transported into specialized cells that developed lignified and suberized (thickened) cell walls, become metabolically inactive, and compartmentalize these often toxic components from metabolically active cells (Geng et al., 2012 and references therein). Cinnamaldehyde can account for 60%-90% of the essential oils of some plant species, an amount that is toxic to surrounding metabolically active cells of the producing plant (Geng et al., 2012). Cinnamaldehyde is well known to be phytotoxic when used as an insecticide on herbaceous plants (Cloyd & Cycholl, 2002).

The high volatility and phytoxicity of cinnamaldehyde has led to recommendations for its use primarily as a disinfectant (Pscheidt and Ocamb, 2014). Because of its disinfecting properties, cinnamaldehyde has also found limited use in agricultural settings for surface contact pest control, when combined with additional preservative compounds. One plant essential oil previously used in agricultural applications and now discontinued was ProGuard® 30% Cinnamaldehyde Flowable Insecticide, Miticide and Fungicide (U.S. Pat. Nos. 6,750,256 B1 and 6,251,951 B1), containing the chemical preservative o-phenylphenol. U.S. Pat. No. 4,978,686 discloses that an antioxidant is required for use with cinnamic aldehyde for a composition which is used for application to crops. A method of protecting crops from attack of pests including insects using a composition comprising cinnamaldehyde and also requiring an antioxidant is disclosed in U.S. Pat. No. 4,978,686. Protection of crops against insect pests by applying an aqueous composition containing a cinnamaldehyde is disclosed in French patent application 2529755. U.S. Pat. No. 2,465,854 describes an insecticidal composition containing a cinnamaldehyde derivative.

In all these cases, however, cinnamaldehyde has only been effective as a contact insecticide, nematicide, miticide or fungicide, applied to the plant surface as a spray or as a soil drench, but with no established value beyond that of a disinfectant. Detergents or emulsifying agents are used to formulate the concentrated product. Not contemplated or suggested were nanoparticle or nanoemulsion formulations containing cinnemaldehyde. Also not contemplated or suggested were applications of cinnamaldehyde to control bacterial infections of plants, particularly to control internal bacterial infections of plants or insects, nor more particularly to control of bacteria that colonize plants or insects intracellularly, since contact with such pathogens would not likely occur, and in addition, either phytotoxicity or insect toxicity would be expected.

In some embodiments, the cinnamaldehyde of the present invention may be prepared by various synthetic methods known to those skilled in the art. For example, see, J. March, ed., Appendix B, Advanced Organic Chemistry: Reactions, Mechanisms, and Structure, 2nd Ed., McGraw-Hill, New York, 1977. Cinnamaldehyde may be prepared synthetically, for example, by oxidation of cinnamyl alcohol (Traynelis et al., J. Am. Chem. Soc. (1964) 86:298) or by condensation of styrene with formylmethylaniline (Brit. patent 504,125). Cinnamaldehyde may also be obtained by isolation from natural sources as known to those skilled in the art. Non-limiting examples of cinnamaldehyde sources include woodrotting fungus, *Stereum subpileatum*, or species of the genus *Cinnamomum* among other sources (Birkinshaw et al., 1957. Biochem. J. 66:188). In particular, cinnamaldehyde is the major component of cinnamon oil (cinnamon bark oil), comprising 85% of the essential oil and the purity of the cinnamaldehyde in the oil is high (>95%) (Ooi et al., 2006). Cinnamon bark extract has been approved as a GRAS (Generally Recognized as Safe) material for food use based on 21 CFR (Code of Federal Regulation) part 172.515 (CFR 2009). Cinnamon bark extract contains multiple active compounds, including cinnamaldehyde, that inhibit microorganisms (Burt 2004).

A number of the aromatic and aliphatic aldehydes may also find use in the subject invention, such as benzaldehyde, acetaldehyde, piperonal, and vanillin, all of which are generally regarded as safe (GRAS) synthetic flavoring agents (21 CFR 172.515). In some embodiments, Coniferyl aldehyde may also find use in the subject invention.

Cell Penetrants

The present invention provides for plants, seeds, seedlings and plant parts such as fruit substantially free of systemic bacterial plant pathogens, particularly those plants, seeds, seedlings and plant parts previously infected with systemic bacterial pathogens of the genus Liberibacter. In some embodiments, the present invention also provides methods for controlling further systemic bacterial pathogen infections of plants using at least one aromatic aldehyde and a polar solvent and/or plant cell penetrant.

In some embodiments, the at least one aromatic aldehyde is combined with a cell penetrant such as a nanoemulsion and/or nanoparticles. In some embodiments, the at least one aromatic aldehyde is combined with a cell penetrant such as Dodecanoic acid, Octadecanoic acid, Tetradecanoic acid or TPGS.

In other embodiments, the at least one aromatic aldehyde is combined with a DMSO cell penetrant. While DMSO has been demonstrated to be effective as a cell penetrant, its phytotoxicity has always been considered to be a negative attribute, limiting its practical application in agricultural settings.

The present invention discloses the surprising finding that the phytotoxicity of aromatic aldehydes such as cinnamaldehyde, in penetrating solvents such as DMSO or formed into nanoemulsions or nanoparticles, if appropriately calibrated in dose, can be used to enhance a plant's natural resistance against certain bacterial pathogens that systemically infect a plant, which is to our knowledge a previously unrecognized property of these compounds. In addition, the present invention discloses a synergistic anti-bacterial effect of aldehydes in combination with DMSO or formed into nanoemulsions or nanoparticles using specific emulsifying agents applied at discernibly phytotoxic levels.

In some embodiments, cell penetrants are utilized at concentrations of at or about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 20%, 11%, 12%, 13%, 14%, 15%, 16%, 17%, 18% 19%, 20%, 21%, 22%, 23%, 24%, 25%, 25%, 27%, 28%, 29%, 30%, 31%, 32%, 33%, 34%, 35%, 36%, 37%, 38%, 39%$^0$, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99% by weight or by volume; wherein the at or about modifier applies to each of the above percentages.

In some embodiments, cell penetrants comprise at or about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 20%, 11%, 12%, 13%, 14%, 15%, 16%, 17/o, 18% 19%, 20%, 21%, 22%, 23%, 24%, 25%, 25%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% of the final solution; wherein the at or about modifier applies to each of the above percentages.

Nanoemulsions

Emulsions refer to a mixture of two or more liquids that are, under standard circumstances, normally immiscible (unmixable or unable to be blended). Examples of emulsions include vinaigrettes, milk, and mayonnaise.

Nanoemulsions differ from emulsions in that droplet sizes are typically equal to or smaller than 250 nm. Nanoemulsions do not form spontaneously; an external shear must be applied to rupture larger droplets into smaller ones and relatively little is known about creating and controlling nanoemulsion formation (Mason et al.). It is generally accepted that the choice of a carrier or adjuvant, emulsifying or dispersing agent seldom increases the penetration of a given agent, since their role is merely to bring the agent into better distribution or contact with the plant surfaces. Few substances are known to be true plant cell penetrants, and none which may be applied generally with any specific agent to materially increase penetration of the agent; these must be discovered. Nanoemulsions and nano-scale emulsions are used as synonyms for the same term within the present disclosure.

In some embodiments, the present invention teaches the use of nanoemulsions to treat citrus greening disease. Donsi et al (2012) teach the encapsulation of carvacrol, limonene and cinnamaldehyde in nanoemulsions prepared by high pressure homogenization and stabilized by different emulsifiers, such as lecithin, pea proteins, and Tween 20. Such preparations are taught as antimicrobial when applied in direct contact with the microbes, and are thought to be useful in food processing, including incorporation into food products or packaging. However, there is no teaching or suggestion that such nanoemulsions could be used to control diseases attacking living plants, much less for the treatment of systemic endophytes in plants or insects.

In some embodiments, emulsions and nanoemulsions are created in the presence of an emulsifying agent. In some embodiments, emulsifying agents may be selected from, but not limited to, the following; accompanied by corresponding CAS Registry Number: Ammonium stearate, 1002-89-7; Ascorbyl palmitate, 137-66-6; Butyl stearate, 123-95-5; Calcium stearate, 1592-23-0; Diglyceryl monooleate, 49553-76-6; Diglyceryl monostearate, 12694-22-3; Dodecanoic acid, monoester with 1,2,3-propanetriol, 27215-38-9; Glycerol monooleate, 111-03-5; Glyceryl dicaprylate, 36354-80-0; Glyceryl dimyristate, 53563-63-6; Glyceryl dioleate, 25637-84-7; Glyceryl distearate, 1323-83-7; Glyceryl monomyristate, 27214-38-6; Glyceryl monooctanoate, 26402-26-6; Glyceryl monooleate, 25496-72-4; Glyceryl monostearate, 31566-31-1; Glyceryl stearate, 11099-07-3; Isopropyl myristate, 110-27-0; Lecithins, 8002-43-5; 1-Monolaurin, 142-18-7; 1-Monomyristin, 589-68-4; Monopalmitin, 26657-96-5; Octanoic acid, potassium salt, 764-71-6; Octanoic acid, sodium salt, 1984-06-1; Oleic acid, 112-80-1; Palmitic acid, 57-10-3; Polyglyceryl oleate, 9007-48-1; Polyglyceryl stearate, 9009-32-9; Polyoxyethylene sorbitan monolaurate (Tween 20), 9005-64-5; Potassium myristate, 13429-27-1; Potassium oleate, 143-18-0; Potassium stearate, 593-29-3; Sodium oleate, 143-19-1; Sodium stearate, 822-16-2; Soya lecithins, 8030-76-0; Tocopheryl polyethylene glycol succinate (TPGS), 9002-96-4; Vitamin E, 1406-18-4; 557-05-1, and Zinc stearate, 557-05-1.

In a further embodiment, the present invention teaches the use of cinnamaldehyde emulsions with up to 9% cinnamaldehyde In some embodiments, the present invention teaches the use of TPGS, Vitamin E, Dodecanoic acid, Octadecanoic acid, Tetradecanoic acid, lecithin and Tween 20 to form emulsions with an aldehyde, e.g., cinnamaldehyde, for treating citrus greening. In some embodiments, multiple emulsifying agents are utilized in creating emulsions and nanoemulsions.

In some embodiments, the nanoemulsions comprise droplets that are less than at or about 250 nm, 245 nm, 240 nm, 235, nm 230 nm, 225 nm, 220 nm, 215 nm, 210 nm, 205, nm 200 nm, 195 nm, 190 nm, 185 nm, 180 nm, 175 nm, 170 nm, 165 nm, 160 rnm, 155 nm, 150 nm, 145 nm, 140 nm, 135 nm, 130 nm, 125 nm, 120 nm, 115 nm, 110 nm, 105 nm, 100 nm, 95 nm, 90 nm, 85 nm, 80 nm, 75 nm, 70 nm, 65 nm, 60 nm, 55 nm, 50 nm, 45 nm, 40 nm, 35 nm, 30 nm, 25 nm, 20 nm, 15 nm, 10 nm, 5 nm, 4 nm, 3 nm, 2 nm, or 1 nm; wherein the at or about modifier applies to each of the specified sizes above.

In some embodiments, the nanoemulsions comprise droplets that range in size from between about 1 nm to 5 nm, 1 nm to 10 nm, 1 nm to 50 nm, 1 nm to 100 nm, 1 nm to 150 nm, 1 nm to 200 nm, 1 nm to 250 nm, 5 nm to 10 nm, 5 nm to 50 nm, 5 nm to 100 nm, 5 nm to 150 nm, 5 nm to 200 nm, 2 nm to 250 nm, 10 nm to 50 nm, 10 nm to 100 nm, 10 nm to 150 nm, 10 to 200 nm, 10 nm to 250 nm, 25 nm to 50 nm, 25 nm to 100 nm, 25 nm to 150 nm, 25 nm to 200 nm, 25 nm to 250 nm, 50 nm to 100 nm, 50 nm to 150 nm, 50 nm to 200 nm, 50 nm to 250 nm, 100 nm to 150 nm, 100 nm to 200 nm, 100 nm to 250 nm, 150 nm to 200 nm, 150 nm to 250 nm, and 200 nm to 250 nm; wherein the about modifier applies to each of the ranges above.

Adjuvants

Adjuvants are understood to comprise any substance in a crop pest control formulation that is added to the spray tank to improve pest control activity or application characteristics. Spray adjuvants are generally grouped into two broad categories which are known as activator adjuvants and special purpose adjuvants.

Activator adjuvants are used to enhance pest control performance through modulating a pesticide's activity, absorption into plant tissue, rainfastness (persistence), and photodegradation. Some common activator adjuvants include surfactants, oils, nitrogen fertilizers, spreader-stickers, wetting agents, and penetrants. Surfactants act through reducing the surface tension between the spray droplet and a leaf surface. Surfactants can be categorized as nonionic, anionic, cationic, amphoteric, and organosilicone surfactants. Oil adjuvants can be categorized as petroleum oils and plant oils, e.g., vegetable oils for penetrating the waxy cuticle.

Special purpose adjuvants are used to widen the range of conditions under which a given formulation is useful and may even alter the physical characteristics of the spray solution. Common special purpose adjuvants may include compatibility agents, buffering agents, antifoam agents, and drift control agents.

In some embodiments, adjuvants are utilized at concentrations at or about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 20%, 11%, 12%, 13%, 14%, 15%, 16%, 17%, 18% 19%, 20%, 21%, 22%, 23%, 24%, 25%, 25%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99% by weight or by volume; wherein the at or about modifier applies to each of the specified sizes above.

In some embodiments, adjuvants comprise at or about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 20%, 11%, 12%, 13%, 14%, 15%, 16%, 17%, 18% 19%, 20%, 21%, 22%, 23%, 24%, 25%, 25%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% of the final solution; wherein the at or about modifier applies to each of the specified sizes above.

Nanoparticles

In some embodiments, the present invention teaches the use of nanoparticles to treat citrus greening disease. Nanoparticles (NPs) are gaining widespread attention due to the significant and unexpected changes in the properties of nano-scale particles as compared to the properties of the bulk material. For bulk materials larger than one micrometer (or micron), the percentage of atoms at the surface is insignificant in relation to the number of atoms in the bulk of the material, whereas nano-scale particles have a much larger surface area to volume ratio. The high surface area to volume ratio of NPs provides a tremendous driving force for diffusion, and in addition, can strongly affect ability of molecular entry into plants. NPs are adsorbed to plant surfaces and taken up through natural openings or wounds.

In some embodiments, the present invention teaches the use of ZnO NPs to treat citrus greening. NPs made of zinc oxide (ZnO) can be manufactured by many methods, and several of the methods lead to ZnO NPs that are in the range of 2 nm (Xie et al., 2011). Like cinnamaldehyde, ZnO NPs have also been shown to exhibit surface disinfectant properties (Hsu et al., 2013).

However, there is no teaching or suggestion that such NPs could be used to control diseases attacking living plants, much less for the treatment of systemic endophytes.

In other embodiments, the present invention teaches the use of poly(lactic-co-glycolic acid) (PLGA) emulsions that form NPs for treating citrus greening. NP sized emulsions made of PLGA polymer are widely used in the pharmaceutical industry to: 1) protect active ingredients from harsh environments; 2) improve delivery of hydrophobic active materials in aqueous enviornments, and 3) increase cellular uptake of active materials (Weiss et al., 2006; Hill et al., 2013). In some embodiments, the present invention teaches the ues of PLGA to encapsulate hydrophobic active materials for treating citrus greening. There is no teaching or suggestion that such nanoencapsulation could be used to control diseases attacking living plants.

In other embodiments, the present invention teaches the use zinc sulfide (ZnS) NPs that for treating citrus greening. NPs made of zinc oxide (ZnS) can be manufactured by many methods, and several of the methods lead to ZnS NPs that are in the range of 3-4 nm, depending upon the capping agent used; capping agents include proteins, amino acids and polymers such as PVP (Weilnau et al, 2011). A further advantage of ZnS over ZnO is that ZnS is known to have more antibacterial against *E. coli* and negligible mammalian cell toxicity (Li et al, 2010).

In some embodiments, the PLGA, ZnS, or ZnO of the nanoparticles are present in a range of at or about 0.01-0.1%, 0.01-0.09%, 0.01-0.08%, 0.01-0.07%, 0.01-0.06%, 0.01-0.05%, 0.01-0.04%, 0.01-0.03%, 0.01-0.02%, 0.02-0.1%, 0.02-0.09%, 0.02-0.08%, 0.02-0.07%, 0.02-0.06%, 0.02-0.05%, 0.02-0.04%, 0.02-0.03%, 0.03-0.09%, 0.03-0.08%, 0.03-0.07%, 0.03-0.06%, 0.03-0.05%, 0.03-0.04%, 0.04-0.09%, 0.04-0.08%, 0.04-0.07%, 0.04-0.06%, 0.04-0.05%, 0.05-0.09%, 0.05-0.08%, 0.05-0.07%, 0.05-0.06%, 0.06-0.09%, 0.06-0.08%, 0.06-0.07%, 0.07-0.09%, 0.07-0.08%, 0.08-0.09%, and 0.02-0.075% of the total composition; wherein the at or about modifier applies to each of the specified ranges above.

In some embodiments, the PLGA, ZnS, or ZnO of the nanoparticles are present in an amount at or about 0.01%, 0.015%, 0.02%, 0.025%, 0.03%, 0.035%, 0.04%, 0.045%, 0.05%, 0.055%, 0.06%, 0.0625%, 0.065%, 0.0675%, 0.070%, 0.075%, 0.080%, 0.0825%, 0.085%, 0.0875%, 0.090%, 0.0925%, 0.095%, 0.0974%, 0.0975%, and 0.1% of the total composition; wherein the at or about modifier applies to each of the specified percentages above.

In other embodiments, the nanoparticles may range in size between, or between about, 0.5-1 nm, 1-2 nm, 1-3 nm, 1-4 nm, 1-5 nm, 2-3 nm, 2-4 nm, 2-5 nm, 3-4 nm, 3-5 nm, 4-5 nm, 5-10 nm, 10-15 nm, 15-25 nm, 25-50 nm, 50-75 nm, 75-100 nm, 100-150 nm, 150-200 nm, 0.5-200 nm, 1-150 nm, 2-200 nm, 2-150 nm, 2-100 nm, 2-75 nm, 2-50 nm, 2-25 nm, 2-15 nm, and 2-10 nm.

In one specific embodiment, the present invention teaches the use of cinnamaldehyde as a capping agent, and the resulting NPs formed were in the 3-4 nm size range.

In a further specific embodiment, the present invention teaches the use of cinnamaldehyde loaded with up to 3% cinnamaldehyde.

The surface coating of some NPs is crucial to determining such critical properties as stability, solubility, shape, size and targeting. ZnO NPs will precipitate in water and both ZnO and ZnS NPs show poor stability in water. This is a major advantage in terms of ultimate breakdown of these NPs within the plant. Thus in some embodiments, the present invention teaches the use of capping agents, such as cinnamaldehyde, to improve the solubility of NPs. In some embodiments, capping agents of the present invention can range from long chain hydrocarbons, to amino acids, to proteins, to polyhydroxy compounds, which become adsorbed to the NP and are so strongly bound that they can be difficult to remove (Niu & Lee, 2013). In other embodiments, the NPs are formed using a surfactant, such as dihydrolipoic acid (DHLA). In some embodiments the benefit of using DHLA as a surfactant is that alpha lipoic acid, the oxidized form of DHLA, is GRAS. Dietary alpha lipoic acid is readily converted to DHLA by NADH or NADPH is most cells. Although DHLA is not currently on the FDA GRAS list, it is available over the counter in health food stores as a dietary supplement (anti-oxidant).

A number of different materials may be used to formulate NPs of the present invention, including, but not limited to: chitosan, PLGA, ZnO and ZnS.

Compositions and Methods of Treating Citrus Greening

In some embodiments, the present invention teaches the use of cinnamaldehyde and solvent either alone or in combination with other active or inactive substances. In some embodiments, the compositions of the present invention may be applied by spraying, soil drenches, pouring, dipping, in the form of concentrated liquids, solutions, suspensions, powders and the like, containing such concentration of the active compound as is most suited for a particular purpose at hand. Cinnamaldehyde is highly hydrophobic and phytotoxic to plants when used at the standard rate of 4.98 ml per liter of a 30% solution normally used for contact disinfection (equal to 1.49 ml cinnamaldehyde per liter or 0.15%). The hydrophobic properties of Cinnamaldehyde in particular can limit its ability to effectively function as an antibacterial agent aqueous environments (Kalemba and Kunicka 2003). The inventors of the present invention discovered that in order to more effectively use aromatic aldehydes in foliar sprays or injectable formulations, although the aldehyde and solvent can be formulated alone, the aldehyde can be rendered more penetrating by including a surfactant such as Tween 80 or Silwet L77. In some embodiments of the present invention, other Liberibacter-curing compounds which can be used alone or in conjunction with the cinnamaldehyde include coniferyl aldehyde, benzaldehyde, acetaldehyde, piperonal, and vanillin, along with the terpene carvacrol.

In some embodiments, the present invention relates to a sprayable or injectable solution of Liberibacter curing compounds in greater than 5% ethyl alcohol or DMSO.

In other embodiments, the invention relates to a solution of aldehydes and any suitable polar solvent.

In some embodiments of the present disclosure, the at least one aromatic aldehyde or an oil comprising said at least one aromatic aldehyde is present in an amount of up to at or about 0.1%, 0.2%, 0.3%, 0.40%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 96%, 97%, 98%, or 99% of the total composition or diluted application; wherein the at or about modifier applies to each of the percentages above.

In some embodiments of the present disclosure, the at least one aromatic aldehyde or an oil comprising said at least one aromatic aldehyde is present in an amount of between 1% and 85%, 1% and 75%, 1% and 65%, 1% and 55%, 1% and 45%, 1% and 35%, 1% and 25%, 1% and 15%, 1% and 5%, 5% and 85%, 5% and 75%, 5% and 65%, 5% and 55%, 5% and 45%, 5% and 35%, 5% and 25%, 5% and 15%, 15% and 85%, 15% and 75%, 15% and 65%, 15% and 55%, 15% and 45%, 15% and 35%0, 15% and 25%, 25% and 85%, 25% and 75%, 25% and 65%, 25% and 55%, 25% and 45%, 25% and 35%, 35% and 85%, 35% and 75%, 35% and 65%, 35% and 55%, 35% and 45%, 45% and 85%, 45% and 75%, 45% and 65%, 45% and 55%, 55% and 85%, 55% and 75%, 55% and 65%, 65% and 85%, 65% and 75%, 75% and 85% of the total composition or diluted application.

In some embodiments of the present disclosure, the at least one aromatic aldehyde or an oil comprising said at least one aromatic aldehyde is present in an amount of between 0.1% and 15%, 0.1% and 14%, 0.1% and 13%, 0.1% and 12%, 0.1% and 11%, 0.1% and 10%, 0.1% and 9%, 0.1% and 8%, 0.1% and 7%, 0.1% and 6%, 0.1% and 5%, 0.1% and 4%, 0.1% and 3%, 0.1% and 2%, 0.1% and 1%, 0.1% and 0.5%, 0.5% and 15%, 0.5% and 14%, 0.5% and 13%, 0.5% and 12%, 0.5% and 11%, 0.5% and 10%, 0.5% and 9%, 0.5% and 8%, 0.5% and 7%, 0.5% and 6%, 0.5% and 5%, 0.5% and 4%, 0.5% and 3%, 0.5% and 2%, 0.5% and 1%, 1% and 15%, 1% and 14%, 1% and 13%, 1% and 12%, 1% and 11%, 1% and 10%, 1% and 9%, 1% and 8%, 1% and 7%, 1% and 6%, 1% and 5%, 1% and 4%, 1% and 3%, 1% and 2%, 2% and 15%, 2% and 14%, 2% and 13%, 20% and 12%, 2% and 11%, 2% and 10%, 2% and 9%, 2% and 8%, 2% and 7%, 2% and 6%, 2% and 5%, 2% and 4%, 2% and 3%, 3% and 15%, 3% and 14%, 3% and 13%, 3% and 12%, 3% and 11%, 3% and 10%, 3% and 9%, 3% and 8%, 3% and 7%, 3% and 6%, 3% and 5%, 3% and 4%, 4% and 15%, 4% and 14%, 4% and 13%, 4% and 12%, 4% and 11%, 4% and 10%, 4% and 9%, 4% and 8%, 4% and 7%, 4% and 6%, 4% and 5%, 5% and 15%, 5% and 14%, 5% and 13%, 5% and 12%, 5% and 11%, 5% and 10, 5% and 9%, 5% and 8%, 5% and 7%, 5% and 6%, 6% and 15%, 6% and 14%, 6% and 13%, 6% and 12%, 6% and 11%, 6% and 10%, 6% and 9%, 6% and 8%, 6% and 7%, 7% and 15%, 7% and 14%, 7% and 13%, 7% and 12%, 70% and 11%, 7% and 10%, 7% and 9%, 7% and 8%, 8% and 15%, 8% and 14%, 8% and 13%, 8% and 12%, 8% and 11%, 8% and 10%, 8% and 9% 9% and 15%, 9% and 14%, 9% and 13%, 9% and 12%, 9% and 11%, 9% and 10%, 10% and 15%, 10% and 14%, 10% and 13%, 10% and 12%, 10% and 11%, 11% and 15%, 11% and 14%, 11% and 13%, 11% and 12%, 12% and 15%, 12% and 14%, 12% and 13%, 13% and 15%, 13% and 140%, and 14% and 15% of the total composition or diluted application.

In some embodiments of the present disclosure, the at least one aromatic aldehyde or an oil comprising said at least one aromatic aldehyde is present in an amount of between about 0.1% and about 15%, about 0.1% and about 14%, about 0.1% and about 13%, about 0.1% and about 12%, about 0.1% and about 11%, about 0.1% and about 10%, about 0.1% and about 9%, about 0.1% and about 8%, about 0.1% and about 7%, about 0.1% and about 6%, about 0.1% and about 5%, about 0.1% and about 4%, about 0.1% and about 3%, about 0.1% and about 2%, about 0.1% and about 1%, about 0.1% and about 0.5%, about 0.5% and about 15%, about 0.5% and about 14%, about 0.5% and about 13%, about 0.5% and about 12%, about 0.5% and about 11%, about 0.5% and about 10%, about 0.5% and about 9%, about 0.5% and about 8%, about 0.5% and about 7%, about 0.5% and about 6%, about 0.5% and about 5%, about 0.5% and about 4%, about 0.5% and about 3%, about 0.5% and about 2%, about 0.5% and about 1%, about 1% and about 15%, about 1% and about 14%, about 1% and about 13%, about 1% and about 12%, about 1% and about 11%, about 1% and about 10%, about 1% and about 9%, about 1% and about 8%, about 1% and about 7%, about 1% and about 6%, about 1% and about 5%, about 1% and about 4%, about 1% and about 3%, about 1% and about 2%, about 2% and about 15%, about 2% and about 14%, about 2% and about 13%, about 2% and about 12%, about 2% and about 11%, about 2% and about 10%, about 2% and about 9%, about 2% and about 8%, about 2% and about 7%, about 2% and about 6%, about 2% and about 5%, about 2% and about 4%, about 2% and about 3%, about 3% and about 15%, about 3% and about 14%, about 3% and about 13%, about 3% and about 12%, about 3% and about 11%, about 3% and about 10%, about 3% and about 9%, about 3% and about 8%, about 3% and about 7%, about 3% and about 6%, about 3% and about 5%, about 3% and about 4%, about 4% and about 15%, about 4% and about 14%, about 4% and about 13%, about 4% and about 12%, about 4% and about 11%, about 4% and about 10%, about 4% and about 9%, about 4% and about 8%, about 4% and about 7%, about 4% and about 6%, about 4% and about 5%, about 5% and about 15%, about 5% and about 14%, about 5% and about 13%, about 5% and about 12%, about 5% and about 110%, about 5% and about 10%, about 5% and about 9%, about 5% and about 8%, about 5% and about 7%, about 5% and about 6%, about 6% and about 15%, about 6% and about 14%, about 6% and about 13%, about 6% and about 12%, about 6% and about 11%, about 6% and about 10%, about 6% and about 9%, about 6% and about 8%, about 6% and about 7%, about 7% and about 15%, about 7% and about 14%, about 7% and about 13%, about 7% and about 12%, about 7% and about 11%, about 7% and about 10%, about 7% and about 9%, about 7% and about 8%, about 8% and about 15%, about 8% and about 14%, about 8% and about 13%, about 8% and about 12%, about 8% and about 11%, about 8% and about 10%, about 8% and about 9% about 9% and about 15%, about 9% and about 14%, about 9% and about 13%, about 9% and about 12%, about 9% and about 11%, about 9% and about 10%, about 10% and about 15%, about 10% and about 14%, about 10% and about 13%, about 10% and about 12%, about 10% and about 11%, about 11% and about 15%, about 11% and about 14%, about 11% and about 13%, about 11% and about 12%, about 12% and about 15%, about 12% and about 14%, about 12% and about 13%, about 13% and about 15%, about 13% and about 14%, and about 14% and about 15% of the total composition or diluted application.

In some embodiments of the present disclosure, the at least one aromatic aldehyde or an oil comprising said at least one aromatic aldehyde is present in an amount of at least 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 96%, 97%, 98%, or 99% of the total composition or diluted application.

In some embodiments of the present disclosure, the polar solvent is present in an amount of up to at or about 1%, 2%, 3%, 4%, 5%, 6%, 70%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 96%, 97%, 98%, or 99% of the total composition or diluted application; wherein the at or about modifier applies to each of the percentages above.

In some embodiments of the present invention, the composition for treating plants infected with Liberibacters comprises at or about 0.001%, 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.70%, 0.8%0, 0.9%, 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, or 100% of a *Liberibacter* curing compound; wherein the at or about modifier applies to each of the above percentages.

In an embodiment of the present disclosure, the solution to treat plants infected with Liberibacters comprises 0.001% to 10%, or 0.01% to 10%, or 0.1 to 10%, or 1 to 5%, or 1 to 10% of a *Liberibacter* curing compound.

In some embodiments the Liberibacter curing compound is an aromatic aldehyde.

In a particular embodiment the aromatic aldehyde is cinnamaldehyde:

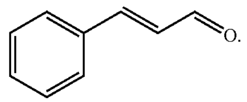

In another embodiment, the aromatic aldehyde is coniferyl aldehyde:

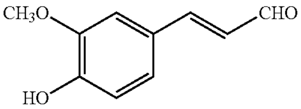

In some embodiments, Liberibacter curing compounds are selected from the group consisting of cinnamaldehyde, conferyl aldehyde, benaldehyde, acetaldehyde, piperonal, and vanillin, along with the terpene carvacrol.

In some embodiments of the present disclosure, the Liberibacter curing compound is solubilized in a percent of at or about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 99% or 100% polar solvent; wherein the at or about modifier applies to each of the percentages above. In some embodiments the protic solvent is ethanol, methanol, isopropanol, and acetic acid among others.

In some embodiments of the present disclosure, the Liberibacter curing compound is solubilized in a percent of at or about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 99% or 100% DMSO; wherein the at or about modifier applies to each of the percentages above.

In some embodiments, the formulation includes cinnamaldehyde and/or coniferyl aldehyde in a formulation involving formation of a nanoparticle and dispersed in an aqueous solution containing 70% ethanol. One formulation for treating Liberibacter infected citrus, potato or tomato, contains cinnamic aldehyde and/or coniferyl aldehyde, 0.001% to 10% by weight in 70% ethanol or 50% DMSO. In some embodiments, the total amount of aldehyde(s) present in the formulation as applied to the plant is 1.5% or less. The formulations are effective and stable without the use of antioxidants, although particular aldehydes may have inherent antioxidant properties, for example, coniferyl aldehyde. Stability of the formulation can be evaluated by a variety of methods, including accelerated tests in which a formulation of interest is exposed to elevated temperatures over a set time. Samples of the formulations are taken at regular intervals and analyzed chemically by methods known to those skilled in the art to determine the rate and nature of degradation.

The most effective amount for compositions including cinnamaldehyde and/or coniferyl aldehyde which may find use and can be determined using protocols such as those described in the Examples. In some embodiments an effective treatment amount is at, or at least, 0.01 g/l, 0.02 g/l, 0.03 g/l, 0.04 g/l, 0.05 g/l, 0.06 g/l, 0.07 g/l, 0.08 g/l, 0.09 g/l, 0.1 g/l, 0.2 g/l, 0.3 g/l, 0.4 g/l, 0.5 g/l, 0.6 g/l, 0.7 g/l, 0.8 g/l, 0.9 g/l, 1 g/l, 2 g/l, 3 g/l, 4 g/l, 5 g/l, 6 g/l, 7 g/l, 8 g/l, 9 g/l, 10 g/l, 11 g/l, 12 g/l, 13 g/l, 14 g/l, 15 g/l, 16 g/l, 17 g/l, 18 g/l, 19 g/l, 20 g/l, 25 g/l, 30 g/l, 35 g/l, 40 g/l, 45 g/l, 50 g/l, 55 g/l, 60 g/l, 65 g/l, 70 g/l, 75 g/l, 80 g/l, 85 g/l, 90 g/l, 95 g/l, or 100 g/l (w/v) of liberibacter curing compound. In some embodiments an effective treatment amount of liberibacter curing compound is 0.01 g/l to 25 g/l. These protocols also can be used to optimize each formulation for specific conditions as well as for use on specific plants to minimize phytotoxicity while maximizing the antipathogenic effect of the formulation.

In some embodiments, the formulation comprises a range of at or about 0.01-1 g/l, 0.5-1 g/l, 1-5 g/l, 1-10 g/l, 1-20 g/l, 1-30 g/l, 1-40 g/l, 1-50 g/l, 1-60 g/l, 1-70 g/l, 1-80 g/l, 1-90 g/l, 1-100 g/l, 2-20 g/l, 2-40 g/l, 2-60 g/l, 2-80 g/l, 2-100 g/l, 2.5-100 g/l, 5-10 g/l, 5-20 g/l, 5-40 g/l, 5-60 g/l, 5-80 g/l, 5-100 g/l, 10-20 g/l, 10-40 g/l, 10-60 g/l, 10-80 g/l, 10-100 g/l, 20-40 g/l, 20-60 g/l, 20-80 g/l, 20-100 g/l, 40-60 g/l, 40-80 g/l, 40-100 g/l, 60-80 g/l, 60-100 g/l, 80-100 g/l, 25-100 g/l, 50-100 g/l, 75-100 g/l (w/v) of an aldehyde of the present disclosure; wherein the at or about modifier applies to each of the ranges above.

In some embodiments, the formulation comprises at least at or about 0.01 g/l, 0.02 g/l, 0.03 g/l, 0.04 g/l, 0.05 g/l, 0.06 g/l, 0.07 g/l, 0.08 g/l, 0.09 g/l, 0.1 g/l, 0.2 g/l, 0.3 g/l, 0.4 g/l, 0.5 g/l, 0.6 g/l, 0.7 g/l, 0.8 g/l, 0.9 g/l, 1 g/l, 2 g/l, 3 g/l, 4 g/l, 5 g/l, 6 g/l, 7 g/l, 8 g/l, 9 g/l, 10 g/l, 11 g/l, 12 g/l, 13 g/l, 14 g/l, 15 g/l, 16 g/l, 17 g/l, 18 g/l, 19 g/l, 20 g/l, 25 g/l, 30 g/l, 35 g/l, 40 g/l, 45 g/l, 50 g/l, 55 g/l, 60 g/l, 65 g/l, 70 g/l, 75 g/l, 80 g/l, 85 g/l, 90 g/l, 95 g/l, or 100 g/l (w/v) of an aldehyde of the present disclosure; wherein the at or about modifier applies to each of the above concentrations.

In some embodiments, the present invention teaches the use of compositions comprising nanoparticles. The nanoparticles may be used alone or in combination with other active or inactive substances. These active or inactive substances may be adhered onto or closely associated to the nanoparticles, or they may incorporated into the structure of the nanoparticles, as occurs with nanoparticle capping.

In some embodiments, the nanoparticles comprise zinc oxide, zinc sulfide, PEG, and PLGA. In some embodiments an effective treatment amount is at or about 0.01 g/l, 0.02 g/l, 0.03 g/l, 0.04 g/l, 0.05 g/l, 0.06 g/l, 0.07 g/l, 0.08 g/l, 0.09 g/l, 0.1 g/l, 0.2 g/l, 0.3 g/l, 0.4 g/l, 0.5 g/l, 0.6 g/l, 0.7 g/l, 0.8 g/l, 0.9 g/l, 1 g/l, 2 g/l, 3 g/l, 4 g/l, 5 g/l, 6 g/l, 7 g/l, 8 g/l, 9, g/l, 10 g/l, 11 g/l, 12 g/l, 13 g/l, 14 g/l, 15 g/l, 16 g/l, 17 g/l, 18 g/l, 19 g/l, 20 g/l, 25 g/l, 30 g/l, 35 g/l, 40 g/l, 45 g/l, 50 g/l, 55 g/l, 60 g/l, 65 g/l, 70 g/l, 75 g/l, 80 g/l, 85 g/l, 90 g/l, 95 g/l, or 100 g/l (w/v) of nanoparticles, nanoemulsions, nanoparticle compositions, or nanoemulsion compositions; wherein the at or about modifier applies to each of the concentrations above.

In further embodiments, an effective treatment amount is at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40, 45%, 50%, 55%, 60%, 65%, 70%, 75%, 80%, 85%, 90%, 95%, or 99% (w/v) of nanoparticles, nanoemulsions, nanoparticle compositions, or nanoemulsion compositions; wherein the at or about modifier applies to each of the percentages above.

In some instances, the efficacy of the formulation can be increased by adding one or more other components, i.e., a compound other than cinnamaldehyde to the formulation where it is desirable to alter particular aspects of the formulation. As an example, it may be desirable for certain applications to decrease the phytotoxicity or to increase the antipathogenic effect of the formulation (e.g. achieve a reduction in titer, referring to the number of bacteria infecting the plants, the incidence of disease, or the incidence of disease symptoms) or both. In one embodiment, the additional component(s) minimize phytotoxicity while increasing the antipathogenic effect of the formulation. Of particular interest is the use of a component(s) which is a synergist to increase the mean disease resistance while minimizing the phytotoxic effect as related to a particular formulation. By “synergistic” is intended a component which, by virtue of its presence, increases the desired effect by more than an additive amount.

A synergistic effect can be defined by applying the Colby formula (Colby, R. S., “Calculating Synergistic and Antagonistic Responses of Herbicide Combinations”, 1967 Weeds, vol. 15, pp. 20-22), i.e. (E)=X+Y−(X*Y/100).

The concentration of one or more of the other formulation ingredients can be modified while preserving or enhancing the desired phytotoxic and antipathogenic effect of the formulation. Of particular interest is the addition of components to a formulation to allow for a reduction in the concentration of one or more other ingredients in a given formulation while substantially maintaining efficacy of the formulation. Combination of such a component with other ingredients of the formulation can be accomplished in one or more steps at any suitable stage of mixing and/or application.

EXAMPLES

TABLE 1

Depicts a quick reference summary for controls and experimental treatments used in field trials detailed below. Specific concentrations, volumes, and compositions utilized in preparing the solutions can be found in the examples below. Results for experiments further described in FIGS. 1-4.

| Treatment | Route of Application | Diluent | Nanoparticle (NP) | Cinnamaldehyde in Diluent | Cinnamaldehyde Incorporated into NPs | Infection Rate | Fruit Yield |
|---|---|---|---|---|---|---|---|
| Control | 5 Sprayed<br>5 Injected | 50% DMSO | None | No | NA | Control | Control |
| 1 | Injection | 50% DMSO | None | 1.5% | NA | Decreased | Increased |
| 2 | Spray | 50% DMSO | None | 1.5% | NA | Decreased | NSD |
| 3 | Spray | 70% Isopropanol | 0.0625% ZnO | No | No | NSD | NSD |
| 4 | Spray | 70% Isopropanol | 0.0625% ZnO | 1.5% | 5% | NSD | Decreased |
| 5 | Injection | 70% Isopropanol | 0.33% ZnO | No | No | NSD | Decreased |
| 6 | Injection | 70% Isopropanol | 0.33% ZnO | 1.5% | 5% | NSD | NSD |
| 7 | Spray | 50% DMSO | 0.02% PLGA | 1.5% | 0.03% | Decreased | NSD |
| 8 | Injection | 50% DMSO | 0.08% PLGA | No | 0.03% | Decreased | NSD |
| 9 | Injection | 50% DMSO | 0.08% PLGA | No | No | Decreased | NSD |
| 10 | Injection | 50% DMSO | 0.15% PLGA | 1.5% | 1.5% | Decreased | NSD |
| 11 | Injection | 50% DMSO | 0.08% PLGA | 1.5% | 1.5% | Decreased | Increased |
| 12 | Spray | 50% DMSO | 0.03% PLGA | 1.5% | 1.5% | Decreased | NSD |
| 13 | Spray | Water | 0.03% PLGA | No | 1.5% | Decreased | Increased |
| 14 | Injection | 25% DMSO | 0.83% ZnS | No | 3% C | Decreased | Increased* |
| 15 | Spray | 25% DMSO | 0.05% ZnS | No | 3% C | Decreased | Increased* |
| 16 | Injection | 25% DMSO | 0.98% ZnS +<br>0.33% PEG | 1.5% | 3% C | NSD | Decreased |
| 17 | Spray | 25% DMSO | 0.07% ZnS +<br>0.03% PEG | 1.5% | 3% C | NSD | Decreased |
| 18 | Injection | Water (+SA) | None | No | NA | NSD | NSD |
| 19 | Spray | Water (+SA) | None | No | NA | NSD | NSD |
| 20 | Injection | 50% DMSO (+SA) | 0.83% ZnS | No | 3% C | Decreased | NSD |
| 21 | Spray | 10% DMSO (+SA) | 0.02% ZnS | No | 3% C | NSD | NSD |

*Fruit yield increased, but applied late in season; significant at 90% confidence level.
NSD, No Significant Difference;
NA, Not Applicable

Example 1: Effect of Cinnamaldehyde, Carvacrol and Geraniol on *E. coli*

The essential oils cinnamadehyde (Aldrich, W228605; ≥98% purity), carvacrol (Aldrich, W224502; ≥98% purity) and geraniol (Aldrich, 163333; 98% purity) were purchased Sigma-Aldrich (St. Louis, Mo.). A single colony of *E. coli* Stratagene strain “Solopack” was inoculated in 5 ml of Luria Broth (LB) liquid medium with shaking at 37° C. overnight. Two hundred µl of the *E. coli* overnight cultures were placed on an LB agar plate, and spread evenly with glass beads. The bacterial culture was allowed to absorb into the LB medium. Within 30 min after absorption, 20 μl drops of the three essential oils (cinnamaldehyde, carvacrol or geraniol) were separately placed without dilution on 6 mm discs (Whatman, Cat No. 2017-006; GE healthcare Life Science) and the treated disks were placed on top of the plates with *E. coli*. The plates were then incubated for 24 hrs. Consistent with the literature, the results were that all three chemicals were inhibitory of the growth of E coil, with carvacrol more inhibitory than cinnamaldehyde, which was in turn more inhibitory than geraniol. Experiments were repeated, with the same results.

Example 2: Effect of Cinnamaldehyde, Carvacrol and Geraniol on *Liberibacter crescens*

Experiments similar to those conducted in Example 1 were conducted using *L. crescens* strain BT-1 (Lcr), except that Lcr was cultured using BM7 medium, top agar was used, and the three chemicals (cinnamaldehyde, carvacrol and geraniol) were diluted with 70% ethanol to concentrations ranging from 2 mg/ml 0.125 mg/ml. BM7 medium contains 2 g alpha ketoguraric acid, 10 g N-(2-Acetamido)-2-aminoethanesulfonic acid, N-(Carbamoylmethyl) taurine, 3.75 g KOH, 150 ml Fetal bovine Serum, 300 ml TNM-FH in 1 Liter (L) water. Agar was added at 20 g/L for solid medium). Lcr BT-1 bacteria were incubated at 29° C. with shaking until reaching an optical density at 600 nm (OD600) of 0.5-0.6. At this point, 500 μl of the cultures were added to 4 ml of 0.6% BM7 top agar, mixed well and then poured on the top of one BM7 plate and allowed to solidify. Immediately after solidifying, 20 μl drops of the three essential oils (cinnamaldehyde, carvacrol and geraniol) were placed using two-fold serial dilutions in 70% ethanol ranging from 2 mg/ml to 0.125 mg/ml on 6 mm discs and the treated disks were placed on top of the plates with Lcr. The plates were then incubated for 5 days. A control solution of 70% ethanol without any added essential oil was also placed on a disk and applied at the same time in each experiment. The results were that only cinnamaldehyde and carvacrol were inhibitory of the growth of Lcr, with surprisingly strong inhibition by cinnamaldehyde at 2 mg/ml and only slight inhibition by carvacrol at the same concentration (a concentration of carvacrol, but not cinnamaldehyde, that is phytotoxic; refer Example 3 below). Geraniol was not inhibitory to Lcr at these levels. Cinnamaldehyde was also inhibitory in these tests to a level of 1 mg/ml. Experiments were repeated twice.

Example 3: Phytotoxic Effect of 10% Cinnamaldehyde, Carvacrol and 70% Ethanol Foliar Sprays on Citrus To test the phytoxicity of cinnamaldehyde or carvacrol in 70% ethanol, and 70% ethanol alone on citrus plants, we applied 1% (w/v) and 10% (w/v) cinnamaldehyde or carvacrol (each dissolved in 70% ethanol) on Swingle rootstocks (~6 inches to 1 foot tall) by spraying to the point of run-off of the spray and also sweet orange (~3 foot tall) by painting one or both sides of a portion of the leaf surface. We also applied 70% ethanol as control in these two methods.

The results were that even 1% carvacrol in 70% ethanol was highly phytotoxic to citrus and to sweet orange leaves, observable by 24 hrs after treatment. By contrast, cinnamaldehyde at 1% in 70% ethanol, and 70% ethanol alone, were not at all phytotoxic to citrus. Cinnamaldehyde at 10% w/v in 70% ethanol was moderately phytotoxic, producing chlorosis and leaf curling, but not defoliation.

Example 4: Phytotoxic Effect of Cinnamaldehyde, Carvacrol and 70% Ethanol Soil Drench on Citrus To further test the phytoxicity of cinnamaldehyde or carvacrol in 70% ethanol, and 70% ethanol alone on citrus plants, we applied 1% and 10% cinnamaldehyde or carvacrol (each dissolved in 70% ethanol) on Swingle rootstocks (~6 inches to 1 foot tall) by adding sufficient liquid to soil of potted citrus to the point of run-off of the drench. We also applied 70% ethanol as control in these two methods.

The results were that carvacrol at 8 mg/ml (1%) of 70% ethanol was highly phytotoxic to citrus as a soil drench, observable by 60 hrs after treatment. By contrast, cinnamaldehyde at 1% in 70% ethanol, and 70% ethanol alone, were not at all phytotoxic to citrus applied as a soil drench. Cinnamaldehyde at 10% w/v in 70% ethanol was moderately phytotoxic, producing chlorosis and leaf curling, but not defoliation.

Example 5: No Effect of 1% Cinnamaldehyde and 70% Ethanol Spray on Curing Las-Infected Citrus To test the ability of 1% cinnamaldehyde to cure Las from systemically infected Pineapple Sweet Orange citrus plants grown from seeds and maintained in a greenhouse, we first graft-inoculated the plants, waited for symptoms to appear (about 6 months later) and then tested for presence of Las infection by semi-quantitative polymerase chain reaction (qPCR or PCR) tests. Granular imidacloprid was applied at recommended rates to all greenhouse grown plants. The plants were confirmed infected in multiple tests over a period of at least 3 months. One (1)% (w/v) cinnamaldehyde (dissolved in 70% ethanol) was then applied by spraying the foliage of infected sweet orange plants to the point of run off of the spray (~3 foot tall trees). Subsequent qPCR tests performed 1-2 weeks later were qPCR positive and remained positive for at least several months. Positive samples were defined as those reaching a $C_t$ (threshold cycle) value of less than or equal to 35, using qPCR primers and methods as described by Li et al (2006). The $C_t$ value a relative measure of the concentration of target in the qPCR reaction. Control citrus plants sprayed with 70% ethanol alone were qPCR positive and remained positive for at least several months. These results indicated that commercially available formulations of cinnamaldehyde, none of which to our knowledge were formulated with DMSO or with use of NPs, would not by themselves kill Las or cure Las infected citrus, due to the protection afforded by an intracellular existence in plants.

Example 6: Effect of 0.3% and 1.5% Cinnamaldehyde in 50% DMSO Sprayed onto HLB Symptomatic, Field Grown Citrus Moved to Pots To test the ability of sprayed cinnamaldehyde to cure Liberibacter from systemically infected sweet orange trees by spraying to run-off and using 50% DMSO as a penetrating solvent, approximately 3 year old mature Hamlin sweet orange trees grafted onto Swingle rootstock and exhibiting strong Huanglongbing (HLB) symptoms in a field situation were pruned to approximately 4 to 5 feet in height, dug out of the field, placed in large (25 gallon) pots, brought into a greenhouse and tested for presence of Las infection by PCR. The plants were confirmed infected in multiple tests over a period of 2 weeks. These plants had been treated with imidacloprid in the field and granular imidacloprid was applied at recommended rates to all greenhouse grown plants. Cinnamaldehyde was then applied at a concentration of either 0.3% and 1.5% (dissolved in 50% DMSO) by spraying the foliage to the point of run off of the spray. The 1.5% cinnamaldehyde treated sweet orange trees, already stressed by uprooting and repotting, completely defoliated 6-7 days later; the 0.3% cinnamaldehyde treated plants appeared unaffected. Approximately 2 weeks later, new shoots began to emerge from the 1.5% treated plants, and the following week, new shoots were large enough to begin PCR tests for presence of Las. The plants treated with 1.5% cinnamaldehyde in 50% DMSO were completely Las negative, but the 0.3% treated plants remained infected. Subsequent qPCR tests performed each week for the next nine months confirmed that the 1.5% treated plants remained completely negative. Similar trees sprayed or injected with 50% DMSO also defoliated but subsequently emerging new shoots either died or were qPCR positive. This demonstrated that 1.5% cinnamaldehyde in 50% DMSO could be utilized to cure Las infections of citrus by spraying re-potted—and therefore highly stressed—citrus trees to run-off.

Example 7: Effect of 1.5% Cinnamaldehyde and 100% DMSO Injected into HLB Symptomatic, Field Grown Citrus Moved to Pots To test the ability of cinnamaldehyde to cure Liberibacter from systemically infected sweet orange trees when delivered using DMSO by injection, approximately 3 year old mature Hamlin sweet orange trees grafted onto Swingle rootstock and exhibiting strong Huanglongbing symptoms in a field situation were pruned to approximately 4 to 5 feet in height, dug out of the field, placed in large (25 gallon) pots, brought into a greenhouse and tested for presence of Las infection by PCR. These plants had been treated with imidacloprid in the field and granular imidacloprid was applied at recommended rates to all greenhouse grown plants. The plants were confirmed infected in multiple tests over a period of 2 weeks. We then used two spring loaded syringes (Chemjet Tree Injectors; Queensland Plastics, Australia) on each tree. Each injector held 20 ml volume of injected material; in this case 1.5% (w/v) cinnamaldehyde in 100% DMSO. The injectors were placed in the trees by drilling a ½" hole ca. ⅘ of the way through the diameter of each trunk, at a site approximately 12-14" above the soil line. The injector was screwed firmly into place and the spring loaded syringe was then released, resulting in pressurized injection of the solution. The 1.5% cinnamaldehyde injected sweet orange trees, already stressed by uprooting and repotting as in Example 6, completely defoliated 6-7 days later. Approximately 2 weeks later, new shoots began to emerge from these treated plants, and the following week, new shoots were large enough to begin PCR tests for presence of Las. The 1.5% treated plants were completely negative, and subsequent PCR tests performed each week for the next 9 months confirmed that the 1.5% cinnamaldehyde injected plants remained completely PCR negative. This demonstrated that 1.5% cinnamaldehyde in 100% DMSO could be utilized to cure Las infections of citrus by injecting re-potted—and therefore highly stressed—citrus trees.

Example 8: Effect of 1.5% Cinnamaldehyde and 50% DMSO on Liberibacter-Infected Citrus Trees Grown in Commercial Groves by Trunk Injection and by Spray Application Most of the trees in an entire commercial grove of well maintained, four year old Hamlin trees grafted onto Swingle citrumello rootstock and treated regularly with imidacloprid insecticide, a plant SAR inducer (Ford et al., 2010), were found to be heavily diseased with classic symptoms of HLB, including blotchy mottling, yellowing of some branches, and premature fruit drop. Highly symptomatic citrus trees were selected, numbered and all were completely randomized as to treatment. Subsequent qPCR testing of 2-3 randomly sampled leaves per tree taken from different branches of each symptomatic tree resulted in a Las positive infection rate of greater than 70% of the trees in the grove. Ten symptomatic trees were randomly selected for trunk injection (Treatment 1 in FIGS. 1 and 2) as outlined in Example 7, using 40 mls of 1.5% (w/v) cinnamaldehyde and 50% DMSO, and another 10 infected trees were randomly selected for spray applications using 800 ml of the same treatment in a manner similar to that used in Example 6, but using 800 ml to cover a much larger, four year old, field grown tree, such that there was no run-off (Treatment 2 in FIGS. 1 and 2). Five trees each were injected and 5 trees sprayed (Controls in FIGS. 1 and 2) using 50% DMSO.

Results presented in FIG. 1 are as % Las infection (total number of positive leaf samples (assessed by qPCR as described above) divided by the total number of leaf samples taken per treatment on a given sampling date). Samples were taken monthly over a period of 6-7 months. Each bar in FIG. 1 represents average % Las infection for each treatment of 10 trees, taken month by month. The "0 month" samples are pooled averages of all trees sampled in each treatment before any treatments. Data are presented are normalized such that pre-treatment infections are 100%. Non-overlapping Standard Errors are significant at $P<0.05$.

Figure 2:
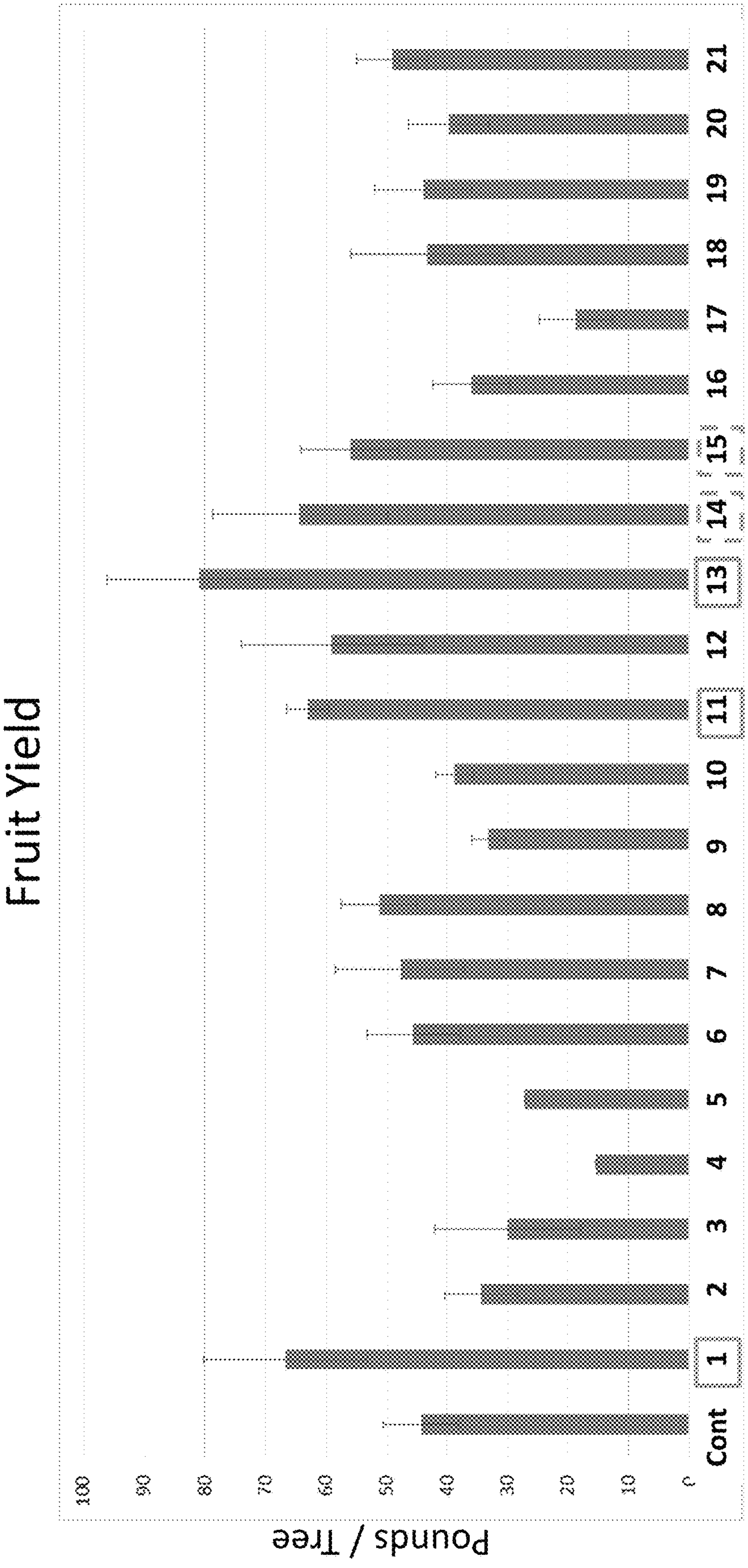
FIG. 2. Hamlin orange fruit yield, measured by pounds of fruit harvested per tree, represented as total fruit weight per tree measured. The control and experimental groups are as described above in FIG. 1. Non-overlapping Standard Errors are significant at P<0.05.
Figure 3:
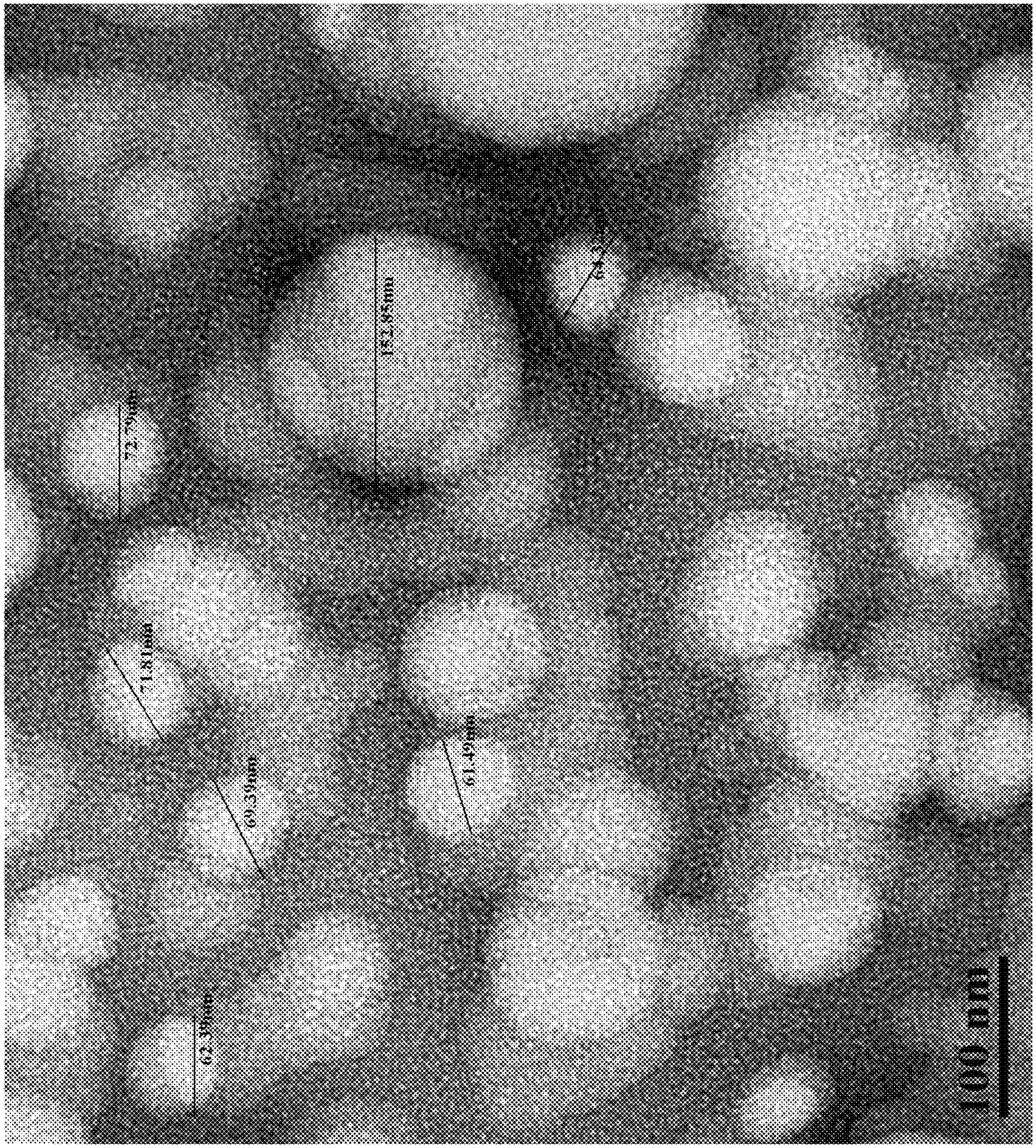
FIG. 3. Transmission electron micrograph (TEM) of PLGA nanoparticles having been sonicated and capped with cinnamaldehyde. The cinnamaldehyde-capped PLGA nanoparticles were estimated to range in size between 60 to 180 nm, as demonstrated in the micrograph FIG. 4. Transmission electron micrograph (TEM) of ZnS nanoparticles created in the presence of cinnamaldehyde and DMSO. The cinnamaldehyde-capped ZnS nanoparticles were estimated to be between 2 to 4 nm, as demonstrated in the micrograph.

For the fruit yield data presented in FIG. 2, all trees were harvested at the same time in the fall (normal for Hamlin oranges in that field), and total fruit weight per tree measured. Treatment 1 yielded 66 pounds of fruit per tree, which was significantly higher than the yield of 45 pounds of fruit per tree from the control group (labeled "Cont" in FIG. 2), while Treatment 2 yielded only 35 pounds of fruit per tree, which was not significantly different from the yield of the control group.

From these results, it is clear that 40 ml 1.5% Cinnamaldehyde in 50% DMSO injected into large, field grown (4 year old) Hamlin citrus trees (Treatment 1) resulted in a significant reduction of Las infection (from about 100% to about 35% infection), and the result lasted for about 3 months. Spray treatments using 800 mls of 1.5% Cinnamaldehyde in 50% DMSO (Treatment 2), also had a statistically significant effect on Las infection levels, but the effect lasted only for 2 months, and appeared less effective overall at the applied application rate, based on an analysis of the total fruit yields measured from all treatments (refer FIG. 2). Treatments 1 and 2 were the only treatments that were reapplied in this field trial; both treatments were reapplied 4 months later to the same trees in the manner described. Again, similar results were observed, with infection levels becoming significantly reduced using both injection or spraying methods.

Example 9: Effect of Zinc Oxide Nanoparticles Alone or Loaded with 1.5% Cinnamaldehyde in 70% Isopropanol on Liberibacter-Infected Citrus Trees in Field Trials by Injection and by Spray Application Zinc oxide (ZnO) nanoparticles were synthesized with slight modifications as outlined by Palanikumar et al. (2013). Zinc nitrate (Zn (NO3)2.6H2O, 0.148 g) was dissolved in 50 ml deionized water with stirring for 30 minutes, and 10.5 g hexamethyltetramine (HMT) was dissolved separately in 50 ml deionized water. Both solutions were stirred for 30 minutes at room temperature and then mixed and stirred at 60° C. in a water bath for 45 minutes. The resulting nanoparticles were collected by centrifugation at 4000×g and weighed. ZnO nanoparticle suspensions, either loaded or not loaded with cinnamaldehyde (ca. 2.5 g wet weight), were prepared. The ZnO nanoparticle suspension without cinnamaldehyde was diluted to 4000 ml using 70% isopropanol and the 0.0625% ZnO NPs were sprayed onto trees at the rate of 800 ml per tree (Treatment 3 in FIGS. 1 and 2). Five percent cinnamaldehyde in 250 ml 70% isopropanol was loaded onto 2.5 g wet weight ZnO nanoparticles and stirred for 60 minutes at room temperature. Nanoparticle suspensions loaded with cinnamaldehyde was diluted to 4000 ml using 1.5% Cinnamaldehyde in 70% isopropanol and sprayed onto trees at the rate of 800 ml per tree (Treatment 4, FIGS. 1 and 2 and Table 1). These results demonstrated that ZnO nanoparticles applied at this level by spray, with or without 1.5% cinnamaldehyde, had no statistically significant effect on Las infections over the course of 7 months, and either a depressing effect (Treatment 4) or no significant effect (Treatment 3) on fruit yield. These results also confirmed the conclusion made and presented in Example 4, that commercially available formulations of cinnamaldehyde applied by spray (1.5% cinnamaldehyde) would not by themselves kill Las or cure Las infected citrus.

ZnO nanoparticle suspensions without cinnamaldehyde (ca. 2.5 g) were diluted to 750 ml using 70% isopropanol and injected into trees at the rate of 40 ml per tree at a concentration of 0.33% ZnO NPs (Treatment 5, FIGS. 1 and 2 and Table 1). Five percent cinnamaldehyde in 250 ml 70% isopropanol was then loaded onto 2.5 g (wet weight) ZnO nanoparticles and stirred for 60 minutes at room temperature. Nanoparticle suspensions loaded with cinnamaldehyde were diluted to 750 ml using 1.5% Cinnamaldehyde in 70% isopropanol and injected into trees at the rate of 40 ml per tree at a concentration of 0.33% (Treatment 6, FIGS. 1 and 2 and Table 1). The results indicated no direct effect from the ZnO NPs injected alone (Treatment 5), but a delayed but significant effect on Las infections from the injection of ZnO NPs loaded with cinnamaldehyde and applied using 70% isopropanol (Treatment 6, FIG. 1).

This conclusion was supported by the fruit yield data in FIG. 2, which indicated a higher yield of fruit from Treatment 6, although the yield increase from this application was not statistically significant at a 95% confidence level using these treatment concentrations. The increase in fruit yield and decrease in Las infection levels may have been due to the injection of cinnamaldehyde alone, but the delayed effect indicates that the ZnO NPs may have mobilized the cinnamaldehyde into the phloem. Thus, in the absence of DMSO, the injection of ZnO NPs appear to have adequately mobilized the cinnamaldehyde into the phloem.

Example 10: Effect of PLGA Blended Emulsions, Made with or without 0.03% Cinnamaldehyde on Liberibacter-Infected Citrus Trees in Field Trials by Trunk Injection and by Spray Application Up to 0.03% cinnamaldehyde was encapsulated using PLGA emulsions blended using didodecyl dimethyl ammonium bromide (DMAB) as the surfactant with slight modifications as outlined by Khemeni et al. (2012). One gram of PLGA was dissolved in 50 ml DMSO and 151 μl (~160 mg) cinnamaldehyde was encapsulated for Treatments 7 and 8, but cinnamaldehyde was omitted from both the emulsion and the diluent for Treatment 9 (refer FIGS. 1 and 2 and Table 1). The above solution was added dropwise into 100 ml 60%-70% DMSO with 0.3% DMAB while stirring vigorously; the solution was emulsified using a commercial blender for 10 mins, then filtered and added to 500 ml deionized water. For treatment 7 (0.02% PLGA and 0.03% cinnamaldehyde), the PLGA emulsion was mixed with 2.8 L of 1.5% cinnamaldehyde in 50% DMSO. Ten symptomatic trees were randomly selected as outlined in Example 9 for spray applications, using 800 ml per tree.

For trunk injections, 650 ml of PLGA emulsions were mixed with 650 ml of 3% cinnamaldehyde in 100% DMSO as outlined in Example 7, using 40 mls per tree of the same treatment (0.02% PLGA, 0.03% cinnamaldehyde). As a control for trunk injection using PLGA alone, 650 ml of PLGA emulsions were mixed with 650 ml of 100% DMSO (Treatment 9 in FIGS. 1 & 2; 0.08% PLGA). The results were that PLGA blended emulsions alone, whether sprayed or injected, had a significant effect on Las infection (Treatments 7, 8 and 9 of FIG. 1), but no significant effect on fruit yield (FIG. 2). These results demonstrated that PLGA emulsions reduced Las infections.

Example 11: Effect of PLGA Nanoparticle-Size Sonicated Emulsions, Made with or without 1.5% Cinnamaldehyde on Liberibacter-Infected Citrus Trees in Field Trials by Trunk Injection and by Spray Application Up to 1.5% cinnamaldehyde was encapsulated using PLGA emulsions, again using DMAB as the surfactant, but with additional modifications to the procedure described in Example 10. In order to determine the effect of sonication on the manufacture of PLGA nanoparticles, one gram of PLGA was dissolved in 50 ml DMSO and 10 ml (~10.5 g) cinnamaldehyde was added for Treatments 10, 11, 12 and 13 (FIGS. 1 and 2 and Table 1). The above solution was added dropwise into 100 ml 60%-70% DMSO with 0.3% DMAB while stirring vigorously; the solution was added dropwise into 500 ml deionized water while stirring vigorously, and the mixture was sonicated. The cinnamaldehyde loaded, PLGA sonicated product was examined by Transmission Electron Microscopy (TEM) and shown in FIG. 3. Cinnamaldehyde encapsulated PLGA emulsions formed nanoparticles ranging in size from 60 to 180 nm.

For Treatment 10 (refer FIGS. 1 and 2 and Table 1), 40 ml of this cinnamaldehyde plus PLGA (0.15% PLGA) product was directly injected per tree. For Treatment 11, a 1:1 dilution of 20 mls of the same product was made by adding 20 ml 1.5% cinnamaldehyde in 50% DMSO and injected per tree (0.08% PLGA). For Treatment 12, 900 ml cinnamaldehyde plus PLGA nanoparticle product was diluted by adding 3.9 liter 1.5% C in 50% DMSO. Each tree was sprayed with 800 ml of this solution (0.03% PLGA) per tree. For Treatment 13, 900 ml cinnamaldehyde plus PLGA nanoparticle product was then diluted by adding 3.9 liter of deionized water. Each tree was sprayed with 800 ml of this solution (0.03% PLGA) per tree.

The results were that all four sonicated PLGA treatments were effective in significantly reducing Las infections in field trees, and that both injected (Treatment 11) and sprayed (Treatment 13) PLGA NPs encapsulated with 1.5% cinnamaldehyde diluted with either 50% DMSO or water, respectively, appeared to significantly increase fruit yields in treated trees. These results demonstrated that: 1) PLGA sonicated emulsions formed NPs; 2) that up to 1.5% cinnamaldehyde could be encapsulated by PLGA, and 3) that PLGA NPs encapsulated with 1.5% cinnamaldehyde diluted with either 50% DMSO or water were effective in both decreasing Las titer and increasing fruit yield in field-grown citrus.

Figure 4:
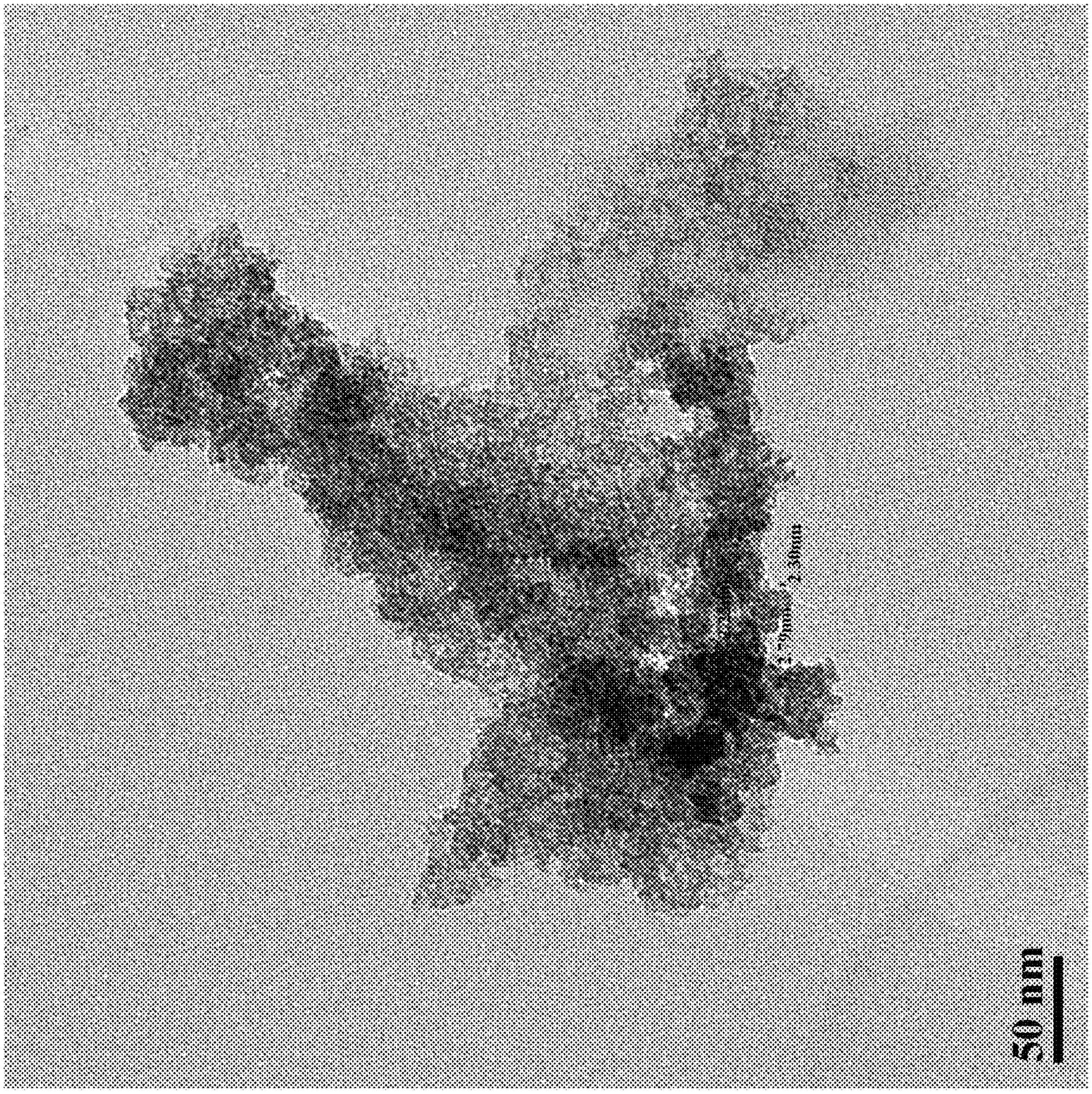

Example 12: Effect of ZnS Nanoparticles Capped with 3% Cinnamaldehyde in 25% DMSO on Liberibacter-Infected Citrus Trees in Field Trials by Trunk Injection and by Spray Application ZnS nanoparticles were synthesized following the protocol described in Weilnau et al 2011 with minor modifications. Cinnamaldehyde (1.4 ml) was added to 23.57 ml of 100% DMSO with constant stirring and then 15 ml deionized water was added dropwise. After the addition of 5.0 ml of 1.0 M zinc acetate, the solution was mixed by constant stirring and 5.0 ml of 0.85 M Sodium sulfide was added while stirring continuously. NPs were collected by centrifuge at 2000×g for 15 minutes and rinsed twice with deionized water. The NPs were washed and resuspended in 50 ml of 25% DMSO. These ZnS NPs capped with 3% cinnamaldehyde were submitted to TEM, and the size range was estimated to be 2-4 nm (FIG. 4). Significantly, NPs of approximately 5 nm or less are predicted to be able to traverse plant cell walls of undamaged cells (Dietz & Herth, 2011). As previously, 40 ml of this suspension was injected per tree (Treatment 14). For spray applications, the same amount of suspension was diluted using 25% DMSO in water to 800 ml and 800 ml was applied per tree (Treatment 15).

The results were that 3% cinnamaldehyde-capped ZnS NPs, whether injected or sprayed, significantly suppressed Las infections among the treated group, and both treatments significantly increased fruit yield, although at a reduced confidence level (90% confidence). The field application of these treatments occurred later than those in treatments 10, 11, 12 and 13; had treatments 14 and 15 been applied earlier, the effects on fruit yield would likely have been higher. These results demonstrated that ZnS NPs: 1) could be directly capped with cinnamaldehyde; 2) that the size of these ZnS NPs was in the 2-4 nm range, and 3) that these NPs were effective, either injected or sprayed, in lowering Las titer and increasing citrus fruit yield in field grown trees infected with Las and showing symptoms of HLB.

Example 13: Effect of ZnS Nanoparticles Capped with 0.33% PEG and 1.5% Cinnamaldehyde in 25% DMSO on Liberibacter-Infected Citrus Trees in Field Trials by Trunk Injection and by Spray Application ZnS nanoparticles capped with PEG were synthesized following the protocol described in Zhang et al 2014 with minor modifications. Using constant stirring, 0.2 g PEG was dissolved in 10 ml deionized water with constant stirring and added to 10 ml 100% DMSO, then 858 μl Cinnamaldehyde was added, followed by 20 ml 0.3 M zinc acetate and 20 ml 0.3 M sodium sulfide. The resulting nanoparticles were collected by centrifuge at 3500 rpm for 10 minutes, rinsed twice with deionized water and resuspended in 60 ml of 25% DMSO. As previously, 40 ml of this suspension was injected per tree (Treatment 16). For spray applications, the same amount of suspension was diluted using 25% DMSO in water to 800 ml and 800 ml was applied per tree (Treatment 17).

The results were that injected PEG and cinnamaldehyde-capped ZnS NPs appeared to provide some suppression of Las infections, but no significant improvement in fruit yield, and spray applications of the same NPs appeared to have little or no effect.

Example 14: Effect of ZnS Nanoparticles Capped with 3% Cinnamaldehyde in 10-50% DMSO with 1.85-3.7% Salicylic Acid (SA) Added on Liberibacter-Infected Citrus Trees in Field Trials by Trunk Injection and by Spray Application As in Example 12, above, ZnS nanoparticles were synthesized following the protocol described in Weilnau et al 2011 with minor modifications. Cinnamaldehyde (1.4 ml) was added to 23.57 ml of 100% DMSO with constant stirring and then 15 ml deionized water was added dropwise. After the addition of 5.0 ml of 1.0 M Zinc Acetate, the solution was mixed by constant stirring and 5.0 ml of 0.85 M Sodium sulfide was added while stirring continuously. Nanoparticles were collected by centrifuge at 2000×g for 15 minutes and the product resuspended in 50 ml of 50% DMSO. To this suspension, 0.925 g of sodium salicylate was added with stirring, and 40 ml of the resulting solution was injected per tree (Treatment 20). As a control, a solution of 40 ml of 1.85% SA was injected per tree (Treatment 18). For spray applications, 50 ml of the ZnS NP product was diluted 1:40 using 10% DMSO with 3.7% SA and 2 liters of this diluted product were sprayed per tree (Treatment 21). As a control, a solution of 2 L of 3.7% SA was spayed per tree (Treatment 19).

The results were that little or no effect on Las infection or fruit yield was observed using SA alone (Treatments 18 and 19). In addition, only moderate effects on Las infection rates were observed and no effects on fruit yield (Treatments 20 and 21) using the same cinnamaldehyde-capped ZnS NPs as were used in Treatments 14 and 15. The SA may have added nothing beneficial to these treatments because all of the trees in the commercial test grove were treated with imidacloprid on a routine basis, and imidacloprid is a potent inducer of the same or similar plant defense pathways as SA. SA may provide benefit in the absence of other such inducers. Comparisons of Treatments 14 and 15 with 20 and 21 revealed that 14 and 15 were superior in terms of effect on both fruit yield and infection suppression, likely because the level of DMSO used in Treatments 14 and 15 was 25%, as compared to 10% in Treatments 20 and 21. Thus the combination of small particle size of NPs capped and/or loaded with aldehydes and the penetrating ability of DMSO may provide a synergistic effect on the delivery of aldehydes to bacteria otherwise protected by plant tissues.

Example 15: Effect of 1.5% Cinnamaldehyde and 5-50% DMSO on Liberibacter-Infected Liberibacter-Infected Potato, Tomato, Celery, and Carrot Plants To test the ability of cinnamaldehyde to cure Liberibacter from systemically infected potato, tomato, celery, and carrot plants, including *Ca. L. solanacearum* and new species of Liberibacters yet to be described, the presence of Liberibacter infection will be tested by PCR using methods well known to those schooled in the art. 1.5% cinnamaldehyde (dissolved in 5-50% DMSO) will be applied to infected potato, tomato, celery and carrot plants by spraying the foliage of plants to the point of run off of the spray. Subsequent PCR tests will be performed 1-2 weeks later using PCR. It is expected that these subsequent PCR tests will be negative or will show showed reductions of titers after treatment.

Example 16: Effect of 0.02%-0.075% PLGA Sonicated Nanoparticles Capped with 1.5% Cinnamaldehyde and Diluted with Water or with 5-50% DMSO and 1.5% Cinnamaldehyde, on Liberibacter-Infected Potato, Tomato, Celery, and Carrot Plants In order to determine the effect of sonication on the manufacture of PLGA nanoparticles, similar methods will be used as provided in Example 10, involving the manufacture of PLGA NPs loaded with cinnamaldehyde. Different spray treatments that proved beneficial for spray applications on citrus, particularly Treatments 12 and 13, will be applied to Liberibacter infected potato, tomato, celery and carrot plants by spraying the foliage of plants to the point of run off of the spray Example 17: Effect of TPGS Nanoemulsions Made with Up to 3% Cinnamaldehyde and DMSO and Diluted with Water or with Water Plus an Adjuvant and 1.5% Cinnamaldehyde on Liberibacter-Infected Citrus, Potato, Tomato, Celery, and Carrot Plants Up to 3% cinnamaldehyde was encapsulated using TPGS emulsions made as outlined in Example 11 with several modifications. Up to 3% cinnamaldehyde in DMSO was used, but without PLGA. This solution was added dropwise into 0.3% TPGS while stirring vigorously; the solution was emulsified first by vortexing at high speed and then by loading into a 50 ml syringe and forcing it through a small diameter (18 gauge) needle using high pressure homogenization. This was repeated 5×. The solution was diluted 5× and 10× using water or 0.05% commercial adjuvant or 5-50% DMSO and will be sprayed until treated plants are drenched.

Significantly reduced infection rates and increased produce yields are expected.

Example 18: Effect of TPGS Nanoemulsions Made with 3% Cinnamaldehyde and Ethyl Acetate and Diluted with Water or with Water Plus an Adjuvant and 1.5% Cinnamaldehyde on Liberibacter-Infected Citrus, Potato, Tomato, Celery, and Carrot Plants Up to 3% cinnamaldehyde was encapsulated using TPGS emulsions made as outlined in Example 17 except that ethyl acetate was used in place of DMSO. The solution was diluted 5× and 10× using water or 0.05% commercial adjuvant or 5-50% DMSO in water and will be sprayed until treated plants are drenched.

Significantly reduced infection rates and increased produce yields are expected

Example 19: Effect of Tween 20 Nanoemulsions Made with 3% Cinnamaldehyde and Ethyl Acetate and Diluted with Water or with Water Plus an Adjuvant and 1.5% Cinnamaldehyde on Liberibacter-Infected Citrus, Potato, Tomato, Celery, and Carrot Plants Up to 3% cinnamaldehyde was encapsulated using Tween 20 emulsions made as outlined in Example 17 except that Tween 20 was used in place of TPGS. The solution was diluted 5× and 10× using water or 0.05% commercial adjuvant or 5-50% DMSO in water and will be sprayed until treated plants are drenched.

Significantly reduced infection rates and increased produce yields are expected.

Example 20: Effect of Tween 20 Nanoemulsions Made with 6% Cinnamaldehyde and Ethyl Acetate, Diluted with Solute or Solute Plus Adjuvant and 1.5% Cinnamaldehyde on Liberibacter-Infected Citrus, Potato, Tomato, Celery, and Carrot Plants Up to 6% cinnamaldehyde was emulsified by adding 40 ml (~42 g) cinnamaldehyde dropwise into 50 ml ethyl acetate while stirring vigorously; the solution was added dropwise into 50 ml 0.3% Tween 20 in deionized water while stirring vigorously. The emulsion was then reduced to a nanoemulsion size by loading into a 50 ml syringe and forcing it through a small diameter (18 gauge) needle causing high pressure homogenization. This was repeated 5×. The solution was added to 250 ml deionized water with constant stirring, forming a stable emulsion that lasted at least one week. The stable nanoemulsion will be diluted 5× and 10× using water, 0.05% commercial adjuvant, or 5-50% DMSO and will be sprayed until treated plants are drenched.

Significantly reduced infection rates and increased produce yields are expected.

Example 21: Effect of a Tween 20 Nanoemulsion Made with 3% Cinnamaldehyde or 4.1% Cinnamon Oil, Diluted with Solute or Solute Plus Adjuvant and 1.5% Cinnamaldehyde on Liberibacter-Infected Citrus, Potato, Tomato, Celery, and Carrot Plants Up to 4.1% cinnamon oil or 3% cinnamaldehyde was emulsified by adding 82% cinnamon oil or 60% cinnamaldehyde and 22% mineral oil to 18% Tween 20 with stirring. The emulsion was diluted 1:20 with deionized water. This emulsion was then reduced to a nanoemulsion size by loading into a 50 ml syringe and forcing it through a small diameter (27 gauge) needle causing high pressure homogenization. This was repeated 5×. The stable nanoemulsion solution was diluted 5× and 10× using water, 0.05% commercial adjuvant, or 5-50% DMSO and will be sprayed until treated plants are drenched.

Significantly reduced infection rates and increased produce yields are expected.

Example 22: Effect of a Tween 20 Composition Nanoemulsion Made with 8.2% Cinnamon Oil, Diluted with Water or Water Plus Adjuvant and 1.5% Cinnamaldehyde on Liberibacter-Infected Citrus, Potato, Tomato, Celery, and Carrot Plants Up to 8.2% cinnamon oil was nanoemulsified as in Example 21. The stable nanoemulsion solution is diluted 5× and 10× using water, 0.05% commercial adjuvant, or 5-50% DMSO and will be sprayed until treated plants are drenched.

Significantly reduced infection rates and increased produce yields are expected.

Example 23: Effect of a Dodecanoic Acid Composition Nanoemulsion Made with Up to 8.2% Cinnamon Oil, Diluted with Water or Water Plus Adjuvant on Liberibacter-Infected Citrus, Potato, Tomato, Celery, and Carrot Plants Up to 8.2% cinnamon oil was emulsified as in Example 21, but using up to 18% dodecanoic acid. These emulsions are then reduced to nanoemulsion size using high pressure homogenization. The stable nanoemulsion solution is diluted 5× and 10× using water, 0.05% commercial adjuvant, or 5-50% DMSO and will be sprayed until treated plants are drenched.

Significantly reduced infection rates and increased produce yields are expected.

Example 24: Effect of a Zinc Stearate Composition Nanoemulsion Made with Up to 8.2% Cinnamon Oil, Diluted with Water or Water Plus Adjuvant on Liberibacter-Infected Citrus, Potato, Tomato, Celery, and Carrot Plants Up to 8.2% cinnamon oil was emulsified as in Example 21. but using up to 18% zinc stearate. These emulsions are then reduced to nanoemulsion size using high pressure homogenization. The stable nanoemulsion solution is diluted 5× and 10× using water, 0.05% commercial adjuvant, or 5-50% DMSO and will be sprayed until treated plants are drenched.

Significantly reduced infection rates and increased produce yields are expected.

Example 25: Effect of a Lecithin Composition Nanoemulsion Made with Up to 8.2% Cinnamon Oil, Diluted with Water or Water Plus Adjuvant on Liberibacter-Infected Citrus, Potato, Tomato, Celery, and Carrot Plants Up to 8.2% cinnamon oil was emulsified as in Example 21, but using up to 18% lecithin. These emulsions are then reduced to nanoemulsion size using high pressure homogenization. The stable nanoemulsion solution is diluted 5× and 10× using water, 0.05% commercial adjuvant, or 5-50% DMSO and will be sprayed until treated plants are drenched.

Significantly reduced infection rates and increased produce yields are expected.

Example 26: Effect of a Glyceryl Dimyristate Composition Nanoemulsion Made with Up to 8.2% Cinnamon Oil, Diluted with Water or Water Plus Adjuvant on Liberibacter-Infected Citrus, Potato, Tomato, Celery, and Carrot Plants Up to 8.2% cinnamon oil was emulsified as in Example 21, but using up to 18% Glyceryl dimyristate. These emulsions are then reduced to nanoemulsion size using high pressure homogenization. The stable nanoemulsion solution is diluted 5× and 10× using water, 0.05% commercial adjuvant, or 5-500% DMSO and will be sprayed until treated plants are drenched.

Significantly reduced infection rates and increased produce yields are expected.

Example 27: Methods for Generation of Large Quantities and Dependable Quality of Nanoemulsions While nanoemulsions may be made in small quantities by loading emulsions into a 50 ml syringe and forcing them repeatedly (5×) through a small diameter (27 gauge) needle, as described in the examples above, this method may be tedious and impractical for larger scale field trials and commercial use. For such purposes, commercial grade machines were required and in the following examples, a Nano DeBEE 45 High Pressure Hanomogenizer (Bee International, S. Easton, Mass., USA) was used to make nanoemulsions.

Example 28: Use of Cinnamon Bark Oil as Source of Cinnamaldehyde

Since cinnamon bark oil is known to be comprised of at least 85% cinnamaldehyde and is a GRAS compound (Ooi et al., CFR 2009, Burt 2004), cinnamon bark oil was used in place of cinnamaldehyde in all of the following examples (Examples 29-34).

Figure 5:
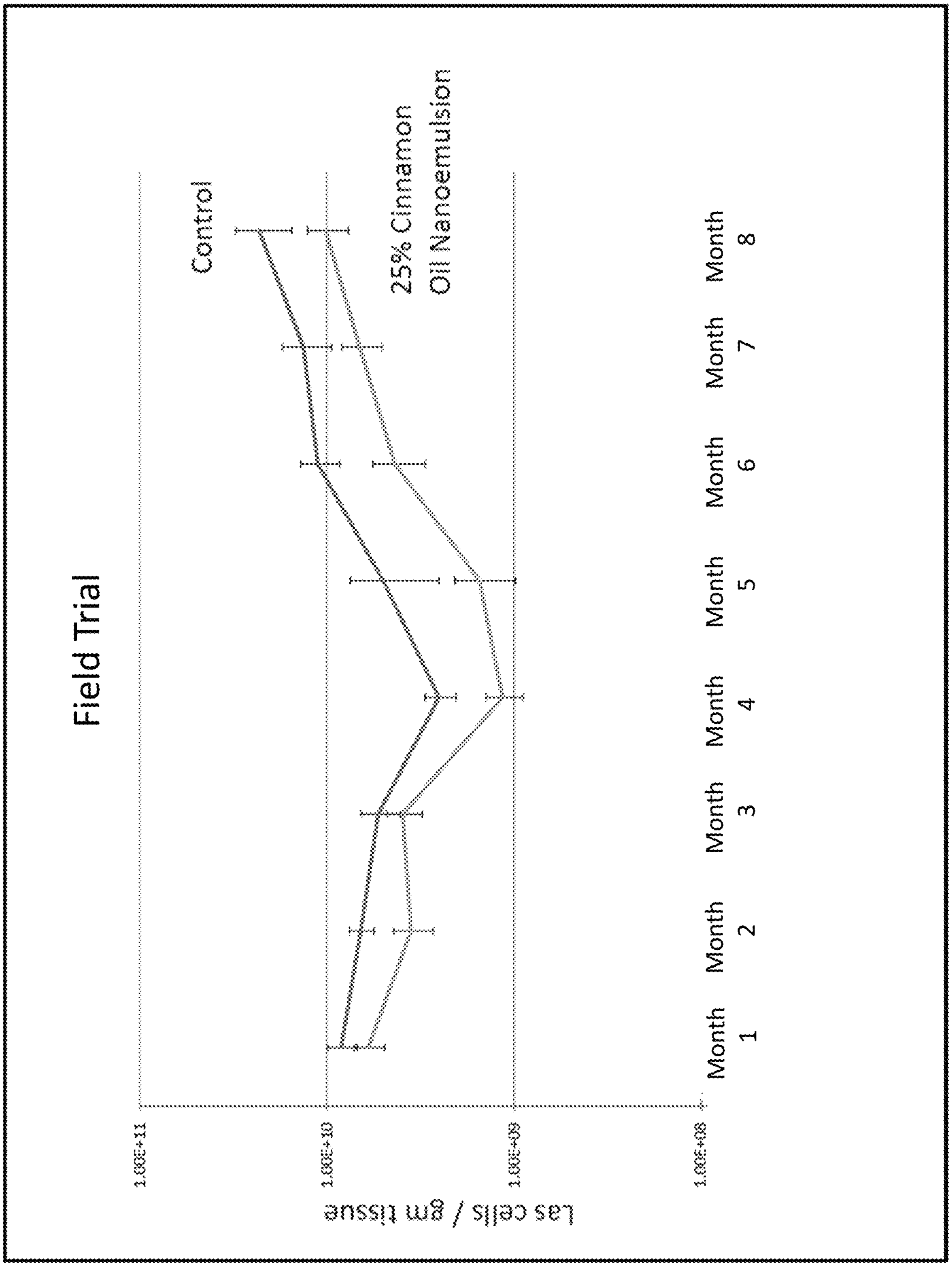
FIG. 5. Depiction of field trial. Suppressive effect of 25% cinnamon oil nanoemulsion sprays on Las titer in a field trial on heavily infected 5-year-old Hamlin orange trees. Four treatments were applied as indicated, and Las titer was sampled monthly.

Example 29: Use of 25%-4-% Cinnamon Bark Oil in Aqueous Nanoemulsions Applied by Spray to Reduce Liberibacter Infection Titer of Citrus Trees in a Field Trial Cinnamon bark oil (25%-40% was combined with 2.8% lecithin in water by mixing, and then processed into a nanoemulsion using a commercial emulsifying machine. The emulsions ranged in size from 70 nm to 1,100 nm. Dilution was 0.5% with water (1:200), and this was applied to 5 year old, heavily Las-infected Hamlin citrus trees in a commercial grove at a rate of 0.4 gallon (1.5 L)/acre in a 2015 Small Scale Field Trial (FIG. 5). Treatments were applied in months 1, 2, 4, and 6. Treatments were made and samples were taken from the same Las infected field grown citrus and assayed for Las by qPCR as described in Example 8, except that the trees were 1 year older. Las titer was estimated as described by Zhang et al., 2011. Sampling for titer was performed initially on 3 branches/tree on 4 trees/block (=12 branches per block) then reduced to 9 positive branches/replicate block chosen for repeat sampling (9 positive branches/block×3 leaves/branch (pooled)×4 replications=36 samples each treatment. Branches were labeled on all 4 trees; negative branches were not sampled in subsequent tests. A branch "sample" consists of 3 fully expanded, tender leaves, combined into a single PCR sample. Three Las-positive branches per tree were sampled separately, and each block contained six trees, four of which were sampled. Four blocks were included in each treatment (control and cinnamon bark oil treatments), and the data averaged. Cycle threshold (Ct) values were converted to estimated bacterial titers using the universal regression equation $Y=13.82-0.2866x$, where Y is the estimated log concentration of DNA templates and X is the qPCR Ct values, as described by Li et al, 2008. Copies of target DNA per gram of sampled leaf tissue was corrected by the dilution factor used in grinding the citrus leaf samples and the copy number of the target DNA (16S rRNA) to obtain titere estimates. The primers and probes used were exactly as described by Li et al., 2006. Samples were considered to be PCR negative when the Ct values were >36.0. Shown in FIG. 5 are the results of a comparison of 25% cinnamon bark oil nanoemulsions applied 4 times during the year as compared to untreated control trees in four separate randomized blocks. Clearly, Las titer was reduced by this 25% cinnamon bark oil treatment.

Example 30: Use of Cinnamon Bark Oil (25%) in Aqueous Nanoemulsions Applied by Spray to Increase Fruit Yield of Citrus Trees in a Field Trial Fruit was harvested by a commercial fruit picking crew from the same trees that were treated and sampled for Las titer in Example 29. The results were that fruit yield increased with the treatment from 89 lbs/tree average for untreated control blocks to 116 lbs/tree average for cinnamon bark oil nanoemulsion treatment blocks. This represents a statistically significant 30% increase over what would have been lost due to HLB caused by Las-infection. Non-overlapping Standard Errors were significant at P<0.05.

Example 31: Use of 25% Cinnamon Bark Oil in Aqueous Nanoemulsions Applied by Spray to Increase Fruit Yield of Citrus Trees in a 34 Acre Field Trial A 34 acre field trial was initiated on commercially grown 3-4 year old, heavily Las-infected Hamlin citrus trees. A total of 17.5 acres of the 34 acre trial was sprayed four times, total, in 2015 with 25% cinnamon bark oil nanoemulsions at a rate of 0.4 gallons (1.5 L)/acre. The remaining 16.7 acres was used as control, and all 34 acres were maintained using grower standard care. The 17.5 acres of cinnamon oil emulsion treated Hamlins yielded 209 boxes of harvested fruit per acre, while the 16.7 acres of control Hamlins yielded 137 boxes of harvested fruit per acre. This amounted to a 53% increased yield of harvestable fruit per acre.

Example 32: Use of Up to 25% Cinnamon Bark Oil to Form PLGA Nanoparticle-Sized Emulsions or Nanocapsules Applied by Spray to Increase Fruit Yield of Citrus Trees in a Field Trial Up to 25% cinnamaldehyde was encapsulated using PLGA nanoemulsions, again using DMAB as the surfactant as described in Example 11. PLGA was dissolved in DMSO to create a 2% PLGA solution, which was added to cinnamon bark oil. A 0.3% DMAB in 95% DMSO solution was added to the DMAB solution, and the resulting mixture diluted with water to provide up to 25% cinnamon bark oil. This solution was immediately passed through a commercial emulsifying machine. The resulting PLGA nanocapsules ranged in size from 80 nm to 900 nm in size (average was about 100 nm). Dilution was 0.5% with water (1:200), and this was applied to 5 year old, heavily Las-infected Hamlin citrus trees in a commercial grove at a rate of 0.4 gallon (1.5 L)/acre. Treatments were applied in months 1, 2, 4, and 6 in the field trial described in Example 30. Fruit was harvested by a commercial fruit picking crew as in Example 30. The results were that fruit yield increased with the treatment from 89 lbs/tree average for untreated control blocks to 106 lbs/tree average for cinnamon bark oil encapsulated emulsion treatment blocks. This represents a statistically significant 19% increase over what would have been lost due to HLB caused by Las-infection. Non-overlapping Standard Errors were significant at P<0.05.

Example 33: Use of a Cinnamon Bark Oil Plus Streptomycin Triple Layer Emulsions to Reduce Liberibacter Infection Titer of Citrus Trees in a 2016 Field Trial Cinnamon bark oil (8%) was combined with 3.7% streptomycin in a triple layer emulsion, made by adding 0.2% gelatin and 0.2% gum arabic to 25% cinnamon oil nanoemulsions; the latter formed as described in Example 29. Two volumes of 6% streptomycin sulphate in water was then added, followed by 0.2% gum arabic and 3% glycerol to form a triple layer emulsion. The triple layer nanoemulsions were formed by coating the single layer cinnamon oil nanoemulsion with the biopolymer gelatin B. The triple-layer nanoemulsion was formed by adding streptomycin sulfate and gum arabic, of opposite charge to gelatin B. The emulsions ranged in size from 100 nm to 8,000 nm, and averaged 1.1 micrometers in size. Dilution was 0.5% with water (1:200), and this was applied to 5 year old, heavily Las-infected Hamlin citrus trees in a commercial grove at a rate of 0.4 gallon (1.5 L)/acre in a 2016 field trial. Treatments were applied in February, April, June and August of 2016. Treatments were made and samples were taken from the same Las infected field grown commercial citrus and assayed for Las by qPCR as described in Example 8, except that the trees were 2 years older. Las titer and sampling was estimated as described in Example 29. Las titer is expected to be reduced.

Example 34: Use of a Cinnamon Bark Oil Plus Streptomycin Triple Layer Emulsions Applied by Spray to Increase Fruit Yield of Citrus Trees in a 2016 Field Trial Fruit will be harvested by a commercial fruit picking crew from the same trees that were treated and sampled for Las titer in Example 33. Fruit yield is expected to increase with the treatment.

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein. All publications, patents, and patent publications cited are incorporated by reference herein in their entirety for all purposes.

The publications discussed herein are provided solely for their disclosure prior to the filing date of the present application. Nothing herein is to be construed as an admission that the present invention is not entitled to antedate such publication by virtue of prior invention.

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

REFERENCES

Abad, J. A., Bandla, M., French-Monar, R. D., Liefting, L. W. and Clover, G. R. G. 2009. First report of the detection of '*Candidatus Liberibacter*' species in zebra chip disease-infected potato plants in the United States. Plant Dis. 93:108.

Alfaro-Fernandez, A., Cebrian, M. C., Villaescusa, F. J., Mendoza, A. H., Ferrandiz, J. C., Sanjuan, S., and Font, M. I. 2012. First Report of '*Candidatus Liberibacter solanacearum*' in Carrot in Mainland Spain. Plant Dis. 96:582.

Alfaro-Fernandez, A., Siverio, F., Cebrian, M. C., Villaescusa, J. F., and Font, M. I. 2012. *'Candidatus Liberibacter solanacearum*' Associated with *Bactericera trigonica*-Affected Carrots in the Canary Islands. Plant Dis. 96:581-582.

Aubert B, Bové J M. 1980. Effect of penicillin or tetracycline injections of citrus trees affected by conditions in Reunion Island. Pages 103-108 In: 8th Conf. Int. Organ. Citrus Virol. B Calavan, S. M. Garnsey, L W Timmer, eds. IOCV, Riverside, Calif.

Beattie, G., Holford, P., Mabberley, D., Haigh, A., and Broadbent, P. 2008. On the origins of citrus, Huanglongbing, *Diaphorina citri* and *Trioza erytreae. International Research Conference on Huanglongbing*, Orlando, Fla., USA: 23-56.

Bosshart, P. D., Iordanov, I., Garzon-Coral, C., Demange, P., Engel, A., Milon, A., and Müller, D. J. 2012. The transmembrane protein KpOmpA anchoring the outer membrane of *Klebsiella pneumoniae* unfolds and refolds in response to tensile load. Structure. 20:121-127.

Bové, J. M. 2006. Huanglongbing: a destructive, newly emerging, century-old disease of citrus. J. Plant Pathol. 88:7-37.

Bové, J. 2013. Heat-tolerant Asian HLB meets heat-sensitive African HLB on the Arabian Peninsula. Why? 3rd International Research Conference on HLB, Orlando, Fla., USA. (http://irchlb.org/files/74c98989-2bd2-4222-b.pdf)

Bové, J. M., and Saglio, P. 1974. Stubborn and Greening: a review, 1969-1972. *Proceedings of 6th Conference IOCV, IOCV, Riverside* 1974, 1-11.

Burt S. 2004. Essential oils: their antibacterial properties and potential applications in foods—a review. Intl J Food Microbiol 94:223-53.

Catling, H. D. 1969. The bionomics of the South African citrus psylla, *Trioza erytreae* (Del Guercio) (Homoptera: Psyllidae). III. The influence of extremes of weather on survival. J. Ent. Soc. S. Africa. 32:273-290.

Choi, A., Kim, C., Cho, Y. et al. 2011. Characterization of Capsaicin-Loaded Nanoemulsions Stabilized with Alginate and Chitosan by Self-assembly Food Bioprocess Technol 4: 1119-1126.

Cloyd, R. A. and N. L. Cycholl. 2002. Phytotoxicity of selected insecticides on greenhouse-grown herbs. HortScience 37:671-672.

de Rudder, K. E. E., Sohlenkamp, C., and Geiger, O. 1999. Plant-exudate choline is used for rhizobial membrane lipid biosynthesis by phosphatidylcholine synthase. J. Biol. Chem. 274:20011-20016.

Deng, W. L., Y. C. Lin, R. H. Lin, C. F. Wei, Y. C. Huang, H. L. Peng, and H. C. Huang. 2010. Effects of galU mutation on *Pseudomonas syringae*-plant interactions. Mol. Plant-Microbe Interact. 23:1184-1196.

Dietz, K. J. and Herth, S. 2011. Plant nanotoxicology. Trends Pl. Sci. 16:582-589.

Donsi, F., Annunziataa, M., Vincensia, M., Ferrari, G. 2011. Design of nanoemulsion-based delivery systems of natural antimicrobials: Effect of the emulsifier. J. Biotechnology 159: 342-350.

Duan, Y, Zhou, L, Hall, D. G., Li, W., Doddapaneni, H., Lin, H., Liu, L., Vahling, C. M., Gabriel, D. W., Williams, K. P., Dickerman, A., Sun, Y. and Gottwald, T. 2009. Complete Genome Sequence of Citrus Huanglongbing Bacterium, "*Candidatus Liberibacter asiaticus*" obtained through metagenomics. Mol. Plant-Microbe Interact. 22:1011-1020.

Ford K A, Casida J E, Chandran D, Gulevich A G, Okrent R A, Durkin K A, Sarpong R, Bunnelle E M, Wildermuth M C. 2010. Neonicotinoid insecticides induce salicylate-associated plant defense responses. Proc Natl Acad Sci USA. 107:17527-32.

Friedman, M., Henika, P. R., and Mandrell, R. E. 2003. Antibacterial activities of phenolic benzaldehydes and benzoic acids against *Campylobacter jejuni, Fscherichia coli, Listeria monocytogenes* and *Salmonella enterica*. J. Food Protect. 66:1811-1821

Garnier, M., Danel, N., and Bov6, J. M. 1984. The greening organism is a Gram negative bacterium. Proceedings of 9th Conference IOCV, IOCV, Riverside, pages 115-124.

Geng, S. L, Cui, Z. X., Shu, B., Zhao, S. and Yu X. H. 2012. Histochemistry and cell wall specialization of oil cells related to the Essential Oil accumulation in the bark of *Cinnamomum cassia* Presl. (Lauraceae). Plant Prod. Sci. 15:1-9.

Geiger, O., Lopez-Lara, I. M., and Sohlenkamp, C. 2013. Phosphatidylcholine biosynthesis and function in bacteria. Biochim. Biophys ACTA-Molec. Cell Bio Lipids 1831: 503-513.

Haakanaa, K., Sarkka, L., Somersalo, S. 2001. Gaseous ethanol penetration of plant tissues positively effects the growth and commercial quality of miniature roses and dill. Sci. Horticulturae 88:71-84.

Hann, D. R, Gimenez-Ibanez, S., Rathjen, J. P. 2010. *Bacterial virulence effectors and their activities. Curr. Opin. Plant Biol.* 13:388-393.

Hansen, A. K., Trumble, J. T., Stouthamer, R., and Paine, T. D. 2008. A new Huanglongbing species, "*Candidatus Liberibacter psyllaurous*," found to infect tomato and potato, is vectored by the psyllid *Bactericera cockerelli* (Sulc). Appl. Environ. Microbiol. 74:5862-5865.

Hill, L. E., Taylor, T. M., and Gomes, C. 2013. Antimicrobial efficacy of poly (D L-lactide-co-glycolide) (PLGA) nanoparticles with entrapped cinnamon bark extract against *Listeria monocytogenes* and *Salmonella typhimurium*. J. Food Sci. 78:N626-N632.

Hollis, D. 1984. Afrotropical jumping plant lice of the family Triozidae (Homoptera: Psylloidea). Bull. Br. Mus. (Natl. Hist.) Entomology. 49: 1-102 p.

Hsu, S, Lin, Y., Huang, S., Lem, K. W., Nguyen, D. H., Lee, D. S. 2013. Synthesis of water-dispersible zinc oxide quantum dots with antibacterial activity and low cytotoxicity for cell labeling. Nanotech. 24: 475102 (11 pp).

Imlau, A. et al. (1999) Cell-to-cell and long-distance trafficking of the green fluorescent protein in the phloem and symplastic unloading of the protein into sink tissues. Plant Cell 11, 309-322.

Jagoueix, S., Bové, J. M., and Garnier, M. 1994. The phloem-limited bacterium of greening disease of citrus is a member of the a subdivision of the Proteobacteria. Int. J. Sys Bacteriol. 44:397-86.

Jeannin, P., Magistrelli, G., Goetsch, L., Haeuw, J. F., Thieblemont, N., Bonnefoy, J. Y., and Delneste, Y. 2002. Outer membrane protein A (OmpA): a new pathogen-associated molecular pattern that interacts with antigen presenting cells-impact on vaccine strategies. Vaccine. 20:A23-27.

Kawahara, K., Seydel, U., Matsuura, M., Danbara, H., Rietschel, E. T., and Zähringer, U. 1991. Chemical structure of glycosphingolipids isolated from *Sphingomonas paucimobilis*. *FEBS Letters*. 292:107-110.
Kalemba D and Kunicka A. 2003. Antibacterial and antifungal properties of essential oils. Curr Med Chem. 10:813-29.
Kawahara, K., Moll, H., Knirel, Y. A., Seydel, U., and Zähringer, U. 2000. Structural analysis of two glycosphingolipids from the lipopolysaccharide-lacking bacterium *Sphingomonas capsulata*. Eur. J. Biochem. 267:1837-1846.
Keck, M., Gisch, N., Moll, H., VorhOlter, F.-J., Gerth, K., Kahmann, U., Lissel, M., Lindner, B., Niehaus, K., and Hoist, O. 2011. Unusual outer membrane lipid composition of the Gram-negative, lipopolysaccharide-lacking Myxobacterium *Sorangium cellulosum* So ce56. J. Biol. Chem. 286:12850-12859.
Khemani. M, Sharon. M, Sharon. M. 2012. Encapsulation of berberine in nano-sized PLGA synthesized by emulsification method. International Scholarly Research Notices (ISRN) Nanotechnology. Volume 2012, Article ID 187354, 9 pages.
Koebnik, R., Locher, K. P., and Van Gelder, P. 2000. Structure and function of bacterial outer membrane proteins: barrels in a nutshell. Mol. Microbiol. 37:239-253.
Laflèche, D. and Bové, J. M. 1970. Structures de type mycoplasme dans les feuilles d'orangers atteints de la maladie du greening. C. R. Acad. Sci. Paris, 270:1915-17.
Li, G., Zhai, J., Li, D., et al. 2010. One-pot synthesis of monodispersed ZnS nanospheres with high antibacterial activity. J. Mater. Chem 20:9215-9219.
Li, W. Hartung, J. H., and Levy, L. 2006. Quantitative real-time PCR for detection and identification of *Candidatus Liberibacter* species associated with citrus huanglongbing. J. Microbiol. Methods 66:104-115.
Li, W. B., Hartung, J. S., and Levy, L. 2008. Optimized quantification of unculturable *Candidatus Liberibacter* spp.' in host plants using real-time PCR. Plant Dis. 92:854-861.
Liefting, L. W., Weir, B. S., Pennycook, S. R., Clover, G. R. G. 2009. *'Candidatus Liberibacter solanacearum'*, associated with plants in the family Solanaceae. Int. J. Sys. Evol. Microbiol. 59:2274-2276.
Leonard, M. T., Fagen, J. R., Davis-Richardson, A. G., Davis, M. J., and Triplett, E. W. 2012. Complete genome sequence of *Liberibacter crescens* BT-1. Stand. Genomic Sci. 7:271-283.
Leone, S., Molinaro, A., Lindner, B., Romano, I., Nicolaus, B., Parrilli, M., Lanzetta, R., and Hoist, O. 2006. The structures of glycolipids isolated from the highly thermophilic bacterium *Thermus thermophilus* Samu-SA1. Glycobiology. 16:766-775.
Li, W., Hartung, J. S., & Levy, L. 2006. Quantitative real-time PCR for detection and identification of *Candidaltus Liberibacter* species associated with citrus huanglongbing. J. Microbiological Methods 66:104-115.
Lin, K. H. 1956a. Yellow shoot of citrus (in Chinese). Acta Phytopathologica *Sinica* 2: 1-12.
Lopes, S. A., Frare, G. F., Bertolini, E., Cambra, M., Fernandes, N. G., Ayres, A. J., Marin, D. R., and Bové, J. M. 2009b. Liberibacters associated with citrus huanglongbing in Brazil: '*Candidants Liberibacter asiaticus*' is heat tolerant, '*Ca. L. americanus*' is heat sensitive. Plant Dis. 93:257-62.
Mason, T. G.; Wilking, J. N.; Meleson, K.; Chang, C. B.; and Graves, S. M. 2006. Nanoemulsions; formation, structure, and physical properties. J. Physics-Condensed Matter. 19:R635-R666.
Moran, V. C., and Blowers, J. R. 1967. On the biology of the South African citrus psylla, *Trioza erytreae* (Del Guercio) (Homoptera: Psyllidae). J. Ent. Soc. S. Africa 30:96-106.
Munyaneza, J. E., Sengoda, V. G., Stegmark, R., Arvidsson, A. K., Anderbrant, O., Yuvaraj, J. K., RAmert, B., and Nissinen, A. 2012a. First report of "*Candidatus Liberibacter solanacearum*" associated with psyllid-affected carrots in Sweden. Plant Dis. 96:453.
Munyaneza, J. E., Sengoda, V. G., Sundheim, L., and Meadow, R. 2012b. First report of "*Candidatus Liberibacter solanacearum*" associated with psyllid-affected carrots in Norway. Plant Dis. 96:454.
Nelson, W. R., Fisher, T. and Munyaneza, J. E. 2011. Haplotypes of "*Candidatus Liberibacter solanacearum*" suggest long-standing separation. Eur. J. Plant Pathology 130:5-12.
Ooi LS1, Li Y, Kam S L, Wang H, Wong E Y, Ooi V E. 2006. Antimicrobial activities of cinnamon oil and cinnamaldehyde from the Chinese medicinal herb *Cinnamomum cassia* Blume. Am J Chin Med. 2006; 34(3):511-22.
Palanikumar, L., Ramasamy, S., Hariharan, G., Balachandran, C. 2013. Influence of particle size of nano zinc oxide on the controlled delivery of Amoxicillin. Appl Nanosci. 3:441-451.
Pieterse, C M, van Wees, S C, Hoffland, E., van Pelt, J A and van Loon, L C. 1996. Systemic resistance in *Arabidopsis* induced by biocontrol bacteria is independent of salicylic acid accumulation and pathogenesis-related gene expression. Plant Cell 8:1225-1237.
Pscheidt, J. W., and Ocamb, C. M., senior editors. 2014. Pacific Northwest Plant Disease Management Handbook [online]. Corvallis, Oreg.: Oregon State University. http://pnwhandbooks.org/plantdisease.
Raddadi, N., Gonella, E., Camerota, C., Pizzinat, A., Tedeschi, R., Crotti, E., Mandrioli, M., Bianco, P. A., Daffonchio, D. and Alma, A. 2011. *'Candidatus Liberibacter europaeus'* sp. nov. that is associated with and transmitted by the psyllid *Cacopsylla pyri* apparently behaves as an endophyte rather than a pathogen. Environ. Microbiol. 13:414-426.
Saglio, P., Laflche, D., Bonissol, C., and Bové, J. M. 1971. Isolement, culture et observation au microscope electronique des structures de type mycoplasme associé à la maladie du stubborn des agrumes et leur comparaison avec les structures observées dans le cas de la maladie du greening des agrumes. Physiologie Végétale 9:569-582.
Schwarz, R. E., and Green, G. C. 1972. Heat requirements for symptom suppression and inactivation of the greening pathogen. Proceedings 5th Conference of the International Organization of Citrus Virologists, University of Florida Press, Gainesville, Fla., 44-51.
Schultz, C. P., V. Wolf, R. Lange, E. Mertens, J. Wecke, D. Naumann, and U. Zähringer. 1998. Evidence for a new type of outer membrane lipid in oral spirochete *Treponema denlicola:* Functioning permeation barrier without lipopolysaccharides. J. Biol. Chem. 273:15661-15666.
Secor, G. A., Rivera, V. V., Abad, J. A., Lee, I.-M., Clover, G. R. G., Liefting, L. W., Li, X., and De Boer, S. H. 2009. Association of '*Candidatus Liberibacter solanacearum*' with zebra chip disease of potato established by graft and psyllid transmission, electron microscopy, and PCR. Plant Dis. 93:574-583.
Smith, S. G. J., Mahon, V., Lambert, M. A., and Fagan, R. P. 2007. A molecular Swiss army knife: OmpA structure, function and expression. FEMS Microbiol. Lett. 273:1-11.

Sugawara, E., and Nikaido, H. 1992. Pore-forming activity of OmpA protein of *Eschericha coli*. J. Bio. Chem. 267:2507-2511.

Teixeira, D. C., Saillard, C., Eveillard, S., Danet, J. L., da Costa, P. I., Ayres, A. J. and Bové, J. 2005. "*Candidatus Liberibacter americanus*", associated with citrus huanglongbing (greening disease) in Sao Paulo State, Brazil. Int. J. Sys. Evol. Microbiol. 55:1857-62.

Weilnau, J N., Black, S E., Chehata, V J., Schmidt, M P., Holt. K L, Carl, L M, Straka, C J, Marsh, A., Patton, W A, Lappasa, C M. 2013. ZnS nanocrystal cytotoxicity is influenced by capping agent chemical structure and duration of time in suspension. J. Appl. Toxicol. 33: 227-237.

Weiss J, Takhistov P, McClements D J. 2006. Functional materials in food nanotechnology. J. Food Sci 71:R107-16.

Wessel, M., Klisener, S., Godeke, J., Fritz, C., Hacker, S. and Narberhaus, F. 2006. Virulence of *Agrobacterium tumefaciens* requires phosphatidylcholine in the bacterial membrane. Mol. Microbiol. 62:906-915.

Xie, Y., He, Y., Irwin, P. L, Jin, T., Shi, X. 2011. Antibacterial Activity and Mechanism of Action of Zinc Oxide Nanoparticles against *Campylobacter jejuni*. App. Environ. Microbiol. 77:2325-2331.

Ye, H., Shen, S., Xu, J., Lin, S., Yuan, Y. and Jones, G. S. 2013. Synertistic interactions of cinnamaldehyde in combination with carvacrol against food-borne bacteria. Food Control 34:619-623.

Yuan, Q., Hein, S., Misra, R. D. K. New generation of chitosan-encapsulated ZnO quantum dots loaded with drug: Synthesis, characterization and in vitro drug delivery response. Acta Biomaterialia 6:2732-2739.

Zhang, Y., Dong, J., He, Z., Yu, Y., Zhang, H., Jiang, Z. 2014. Hydrothermal synthesis of PEG-capped ZnS:Mn2+ quantum dots nanoparticles. Chem. Res. Chin. Univ. 30: 176-180.

Zhang M Q, Duan Y P, Zhou L J, Turechek W W, Stover E, Powell C A. 2010. Screening molecules for control of citrus huanglongbing using an optimized regeneration system for *Candidatus Liberibacter asiaticus*-infected periwinkle (*Catharanthus roseus*) cuttings. Phytopathology 100:239-245.

Zhang M Q, Powell C A, Zhou U, He Z L, Stover E, Duan Y P. 2011. Chemical compounds effective against the citrus Huanglongbing bacterium *Candidatus Liberibacter asiaticus* in planta. Phytopathology 101:1097-1103.

Zipfel, C., and Robatzek, S. 2010. Pathogen-associated molecular pattern-triggered immunity: Veni, Vidi . . . ? Plant Physiol. 154:551-554.

The invention claimed is:

1. A method for treating one or more citrus plants infected with at least one systemic bacterial plant pathogen, the method comprising contacting or injecting one or more parts of said one or more citrus plants with a composition comprising a nanoemulsion and/or nanoparticles containing at least one antimicrobial aromatic aldehyde, wherein the at least one systemic bacterial plant pathogen leads to Huanalongbing (HLB) in the citrus plants, and wherein the at least one aromatic aldehyde comprises cinnamaldehyde.

2. The method of claim 1, wherein the composition comprises a nanoemulsion and the nanoemulsion is made from Vitamin E, Tocopheryl Polyethylene Glycol Succinate (TPGS), Dodecanoic Acid, Zinc stearate, Glyceryl dimyristate, Lecithin, Oleic Acid, and/or Polyoxyethylene sorbitan monolaurate (Tween 20).

3. The method of claim 2, wherein the nanoemulsion is made from Lecithin.

4. The method of claim 1, wherein the composition comprises nanoparticles comprising (a) PLGA present in a range of 0.02% to 0.075% of the total composition; (b) ZnS present in an amount of about 0.974% of the total composition, or (c) ZnO present in an amount of about 0.0625% of the total composition.

5. The method of claim 1, wherein the composition comprises nanoparticles and the nanoparticles are made from zinc sulfide, zinc oxide, polyethylene glycol, or poly (lactic-co-glycolic acid) (PLGA).

6. The method of claim 5, wherein the nanoparticles are made from PLGA.

7. The method of claim 1, wherein said cinnamaldehyde is present in an amount of about 0.1% to about 40% of the composition.

8. The method of claim 1, wherein the at least one systemic bacterial plant pathogen is a member of genus *Liberibacter* or *Ca. Liberibacter.*

9. The method of claim 8, wherein the at least one systemic bacterial plant pathogen is *Ca. Liberibacter asiaticus, Ca. Liberibacter africanus*, or *Ca. Liberibacter americanus.*

10. The method of claim 1, wherein the one or more citrus plants is a transgenic citrus plant.

11. The method of claim 1, wherein the one or more citrus plant infected with at least one systemic bacterial plant pathogen exhibit a decrease in the systemic bacterial plant pathogens and an increase in fruit yield after the treatment, relative to plants not having been contacted or injected with the composition.

12. The method of claim 1, wherein there is a reduction of at least 10% in the number of the systemic bacterial plant pathogens in infected plants at least one month after treatment of said one or more citrus plants.

13. The method of claim 1, wherein cinnamon bark oil is the source of the at least one aromatic aldehyde.

14. The method of claim 1, wherein the composition further comprises streptomycin.

* * * * *